(12) United States Patent
Tjerrild

(10) Patent No.: US 10,914,334 B2
(45) Date of Patent: Feb. 9, 2021

(54) WALL MOUNTING ASSEMBLY

(71) Applicant: FOOD GRADE SOLUTIONS, LLC, Fowler, CA (US)

(72) Inventor: James Tjerrild, Fresno, CA (US)

(73) Assignee: Food Grade Solutions, LLC, Fowler, CA (US)

(*) Notice: Subject to any disclaimer, the term of this patent is extended or adjusted under 35 U.S.C. 154(b) by 99 days.

(21) Appl. No.: 16/120,148

(22) Filed: Aug. 31, 2018

(65) Prior Publication Data
US 2019/0301508 A1    Oct. 3, 2019

Related U.S. Application Data

(63) Continuation-in-part of application No. 15/941,355, filed on Mar. 30, 2018.

(51) Int. Cl.
  *F16B 13/06* (2006.01)
  *F16B 13/08* (2006.01)

(52) U.S. Cl.
  CPC ........ *F16B 13/066* (2013.01); *F16B 13/0808* (2013.01); *F16B 13/0833* (2013.01); *F16B 13/0858* (2013.01)

(58) Field of Classification Search
  CPC .. F16B 13/066; F16B 13/065; F16B 13/0808; F16B 2013/105; F16B 13/04; F16B 13/045; F16B 13/0858; F16B 13/0841; F16B 13/063; F16B 2013/009; F16B 13/00; F16B 13/14; F16B 2013/006; F16B 13/0833; F16B 13/08; F16B 13/12; F16B 13/124; F16B 2013/10; F16B 13/02

USPC ............................................. 411/340; 248/65
See application file for complete search history.

(56) References Cited

U.S. PATENT DOCUMENTS

| | | | |
|---|---|---|---|
| 784,845 A | 3/1905 | Evans | |
| 1,108,922 A * | 9/1914 | Menten ............... | F16B 13/0808 411/346 |
| 1,168,257 A * | 1/1916 | Kennedy ............. | F16B 13/0808 411/346 |
| 1,346,578 A * | 7/1920 | Windsor ............. | F16B 13/0808 411/340 |
| 1,360,200 A * | 11/1920 | Dowd ................. | F16B 13/0808 411/342 |
| 1,370,319 A * | 3/1921 | Kennedy ............. | F16B 13/0808 411/341 |

(Continued)

*Primary Examiner* — Ingrid M Weinhold
(74) *Attorney, Agent, or Firm* — Neal, Gerber & Eisenberg LLP; Bradley Rademaker; Nawshaba M. Siddiquee

(57) ABSTRACT

Embodiments include a mounting assembly for securing a supported element to a wall structure having an internal thickness residing between opposing first and second sides of the wall structure. The assembly comprises a toggle anchor assembly configured to pass through a hole formed through the internal thickness; a washer configured for attachment to the hole adjacent to the first side of the wall structure, the washer comprising an open center configured to receive an extent of the toggle anchor assembly therethrough; an end assembly configured for coupling to an end portion of the toggle anchor assembly and for securing the toggle anchor assembly to the wall structure; and a receiving portion for securement of a strut assembly to the toggle anchor assembly, the strut assembly being coupled to the supported element.

22 Claims, 19 Drawing Sheets

(56) References Cited

U.S. PATENT DOCUMENTS

| | | | | |
|---|---|---|---|---|
| 1,373,188 | A * | 3/1921 | Goewey | F16B 13/0808 411/342 |
| 1,600,034 | A * | 9/1926 | Brenizer | F16B 13/0808 411/346 |
| 1,705,086 | A | 3/1929 | Ferguson | |
| 1,835,243 | A | 12/1931 | Schaffert | |
| 2,061,634 | A * | 11/1936 | Pleister | F16B 13/0808 411/342 |
| 2,150,080 | A | 3/1939 | Rawlings | |
| 3,532,024 | A * | 10/1970 | Gutshall | F16B 13/0808 411/38 |
| 3,662,644 | A | 5/1972 | Flesch et al. | |
| 3,711,138 | A | 1/1973 | Davis | |
| 3,813,986 | A * | 6/1974 | McVittie | F16B 13/066 411/53 |
| 4,079,655 | A * | 3/1978 | Roberson, Jr. | F16B 13/0808 411/344 |
| 4,432,683 | A * | 2/1984 | Polos | F16B 35/04 411/340 |
| 4,573,844 | A * | 3/1986 | Smith | F16B 13/0808 24/453 |
| 4,657,461 | A * | 4/1987 | Smith | F16B 13/0808 24/453 |
| 4,704,057 | A * | 11/1987 | McSherry | F16B 13/0808 411/344 |
| 4,856,951 | A | 8/1989 | Blucher et al. | |
| D313,344 | S | 1/1991 | Tritle | |
| 4,997,327 | A * | 3/1991 | Cira | F16B 13/0808 411/340 |
| 5,224,807 | A * | 7/1993 | Belser | F16B 13/0808 411/342 |
| 5,339,593 | A | 8/1994 | Ludwig et al. | |
| 5,573,548 | A | 11/1996 | Nazre et al. | |
| D381,892 | S | 8/1997 | Porter et al. | |
| 5,682,678 | A | 11/1997 | Gallagher et al. | |
| 5,692,864 | A | 12/1997 | Powell et al. | |
| D398,363 | S | 9/1998 | LoBue | |
| 5,964,783 | A | 10/1999 | Grafton et al. | |
| 5,980,174 | A | 11/1999 | Gallagher et al. | |
| 6,361,258 | B1 | 3/2002 | Heesch | |
| 6,635,058 | B2 | 10/2003 | Beyar et al. | |
| 6,679,661 | B2 | 1/2004 | Huang | |
| 6,702,534 | B2 | 3/2004 | Filipp | |
| 6,821,069 | B2 * | 11/2004 | Ikuta | F16B 13/0808 411/340 |
| 7,651,056 | B2 | 1/2010 | Tjerrild | |
| 7,727,235 | B2 | 6/2010 | Contiliano et al. | |
| 7,926,766 | B2 | 4/2011 | Tjerrild | |
| 7,931,242 | B2 | 4/2011 | Tjerrild | |
| 7,934,895 | B2 | 5/2011 | Ernst et al. | |
| 7,985,040 | B2 | 7/2011 | Cao | |
| 8,057,147 | B2 | 11/2011 | Ernst et al. | |
| 8,112,864 | B2 | 2/2012 | Vincent | |
| 8,448,910 | B2 | 5/2013 | Ernst et al. | |
| 8,511,035 | B2 | 8/2013 | Zimmer et al. | |
| 8,740,527 | B2 | 6/2014 | Cheng | |
| 8,832,920 | B2 | 9/2014 | Goldberg | |
| 8,925,172 | B2 | 1/2015 | English | |
| 9,273,710 | B1 * | 3/2016 | Chang | F16M 13/02 |
| 9,291,188 | B2 | 3/2016 | English | |
| D816,469 | S | 5/2018 | Toomey | |
| 9,958,000 | B2 | 5/2018 | Chang | |
| 2002/0173822 | A1 | 11/2002 | Justin et al. | |
| 2004/0208721 | A1 | 10/2004 | Kuenzel | |
| 2004/0208722 | A1 * | 10/2004 | Kuenzel | F16B 13/0858 411/340 |
| 2004/0253075 | A1 | 12/2004 | Liebig et al. | |
| 2005/0210771 | A1 * | 9/2005 | Kuenzel | F16B 13/0858 52/155 |
| 2006/0178246 | A1 | 8/2006 | Tjerrild | |
| 2006/0186278 | A1 | 8/2006 | Tjerrild | |
| 2008/0124188 | A1 | 5/2008 | Chang et al. | |
| 2008/0253860 | A1 * | 10/2008 | McDuff | F16B 13/0808 411/344 |
| 2009/0022564 | A1 | 1/2009 | Summerfield | |
| 2009/0090820 | A1 | 4/2009 | Tjerrild | |
| 2009/0208310 | A1 * | 8/2009 | Ikuta | F16B 13/0808 411/344 |
| 2010/0084519 | A1 | 4/2010 | Tjerrild | |
| 2011/0117355 | A1 | 5/2011 | Selle | |
| 2011/0163208 | A1 * | 7/2011 | Tjerrild | F16L 3/133 248/65 |
| 2012/0183371 | A1 | 7/2012 | Druschel et al. | |
| 2012/0328392 | A1 * | 12/2012 | Difante | F16B 13/0808 411/342 |
| 2013/0269170 | A1 | 10/2013 | Goldberg | |
| 2014/0017026 | A1 | 1/2014 | Cheng | |
| 2015/0023760 | A1 | 1/2015 | Bove, III et al. | |
| 2015/0117979 | A1 | 4/2015 | Anderson | |
| 2015/0176624 | A1 | 6/2015 | Bosco | |
| 2015/0313659 | A1 | 11/2015 | Miyawaki et al. | |
| 2019/0301505 | A1 | 10/2019 | Tjerrild | |

* cited by examiner

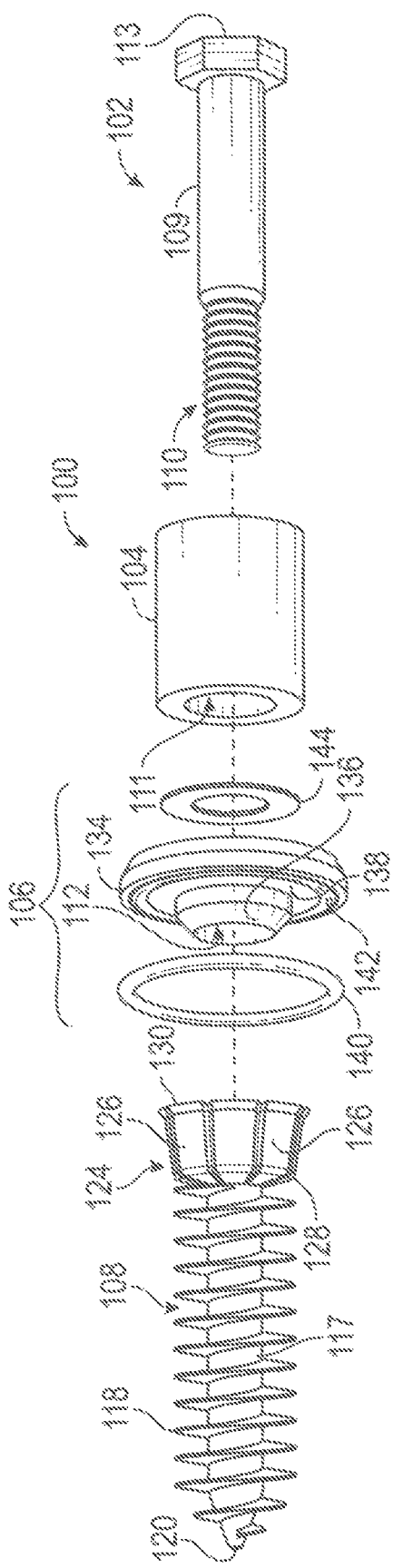
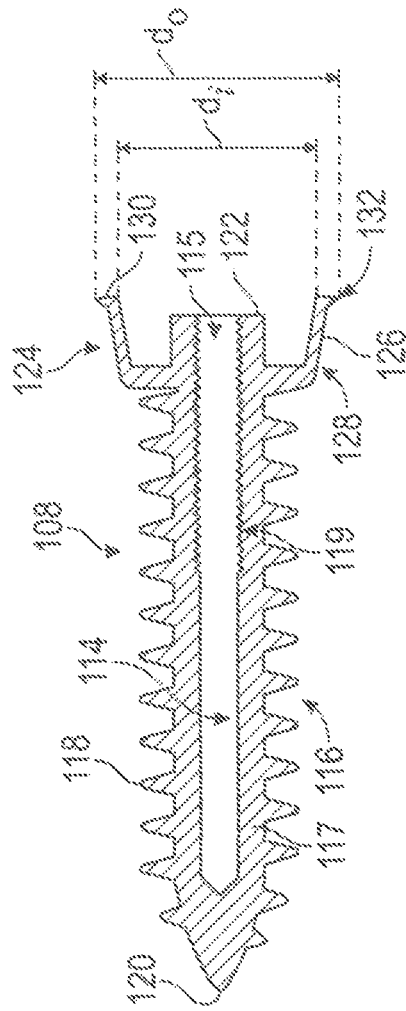
FIG. 1
FIG. 2

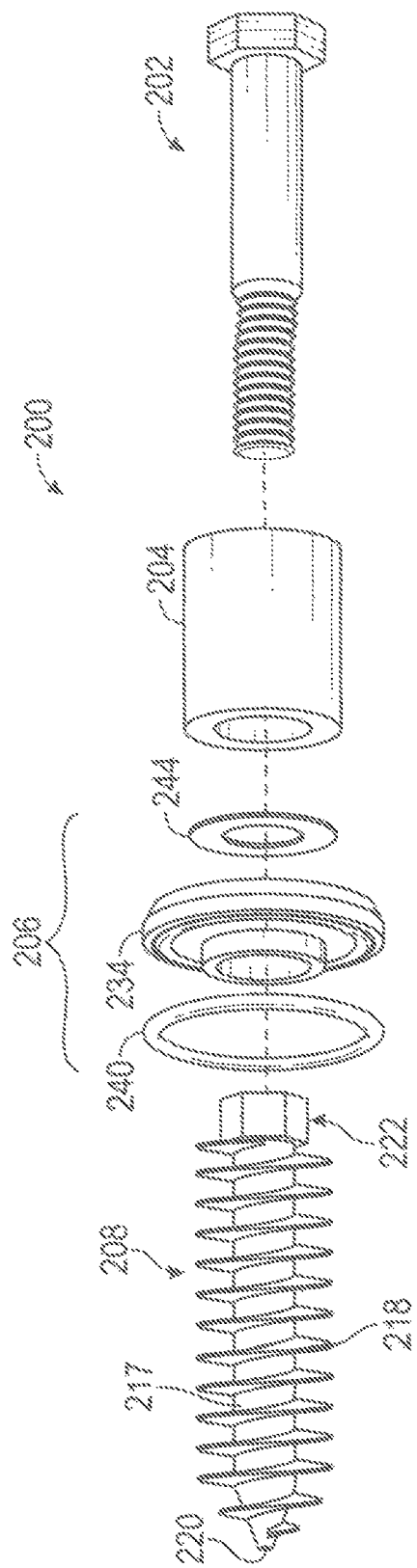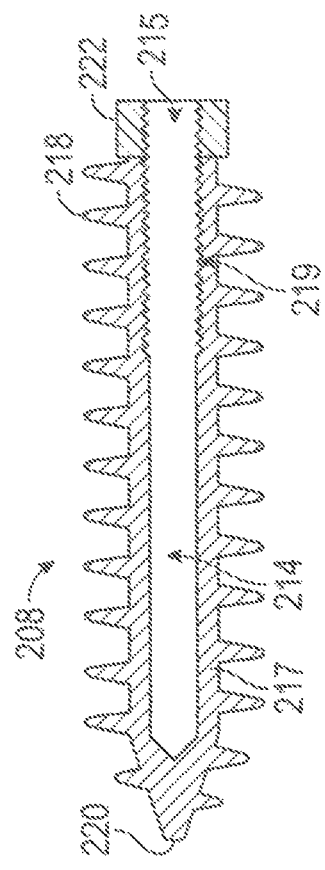

WALL MOUNTING ASSEMBLY

BACKGROUND

The description that follows relates to a mounting assembly for securing an object to a wall, ceiling, or other support structure. More specifically, the description relates to a wall or ceiling mounting assembly intended to be used in food processing, pharmaceutical processing, and other facilities that require a high degree of cleanliness or enhanced sanitation.

Food processing and pharmaceutical processing facilities typically use conventional mounting systems to install pipes, conduit, and tubes. These conventional mounting systems are difficult to inspect and clean and tend to be prone to contamination, thus rendering them inherently dirty and possibly leading to food and drug safety issues. For example, conventional mounting systems may be used to mount pipes, conduits, and tubes to vertical and horizontal surfaces (e.g., walls). As will be appreciated, upward facing surfaces are especially at risk for collecting contaminants, falling debris, and water from wash downs. While the food and pharmaceutical processing facilities may be designed with enhanced sanitation in mind, the conventional mounting systems themselves can include horizontal surfaces or upward facing channels that are prone to contamination such as by collecting dust and debris on surfaces. Also, any unused slots or holes within the mounting system provide areas in which dirt, debris, and other contaminants can collect.

Further, any surface that cannot be easily inspected or cleaned can be susceptible to harboring filth and mildew and allow for collection of hazardous dust from food preparation or manufacturing process. For example, some conventional mounting systems are typically mounted directly onto the wall and the systems are designed such that small gaps exist between the mounting system and the wall, and these gaps are not easily accessible for inspection or cleaning. As another example, some conventional mounting systems include exposed threaded surfaces that are difficult to clean and tend to collect debris. Some mounting systems may require disassembly in order to achieve an adequate level of cleaning.

Moreover, most conventional mounting systems cannot be securely fastened to laminated foam wall panels, as are commonly used in the wall and/or ceiling structures of food and pharmaceutical processing facilities. For example, the insulated wall panel products sold by Kingspan®, such as the Mineral Fiber (MF) Fire Rated wall panel system, have a compressible interior made of foam and a hard exterior or cladding made of metal (e.g., aluminum, stainless steel, etc.) or the like. The wall mounting screws found in many conventional mounting systems are not ideal for gripping the foam interior of such wall panels and staying in place for mounting a load, such as a conduit or pipe or the like, and do not provide a suitable mounting assembly for food preparation areas to prevent collection of dust or allow for cleaning of the mounting assembly.

Accordingly, there is still a need in the art for wall mounting assemblies that are suitable for locations requiring a high degree of cleanliness, can resist contamination, and are easy to inspect and clean.

SUMMARY OF THE INVENTION

The invention is intended to solve the above-noted problems by providing, among other things, a mounting assembly capable of securing a supported element, such as pipes, conduit, or tubes, to a wall, ceiling, or other support structure, while providing enhanced sanitation suitable for food grade and pharmaceutical grade installations. For example, the wall mounting assembly is configured to resist contamination and is easy to clean and inspect.

The invention is particularly advantageous for use with a wall, ceiling, or other support structure in a food processing facility or manufacturing area that includes laminated foam panels, as is commonly used, including wall panel products such as Kingspan® Insulated Panels. The invention provides an assembly and method of securing a mounting bracket to the support structure which was previously unavailable.

A better understanding of the invention will be obtained from the following detailed descriptions and accompanying drawings, which set forth illustrative embodiments that are indicative of the various ways in which the principals of the invention may be employed.

BRIEF DESCRIPTION OF THE DRAWINGS

FIG. 1 is an exploded perspective view of an exemplary fastener assembly, in accordance with certain embodiments;

FIG. 2 is a cross-sectional side view of an exemplary wall anchor included in the fastener assembly of FIG. 1, in accordance with certain embodiments;

FIG. 12 is a exploded perspective view of another exemplary fastener assembly, in accordance with certain embodiments;

FIG. 13 is a cross-sectional side view of an exemplary wall anchor included in the fastener assembly of FIG. 12, in accordance with certain embodiments.

Figure 3:
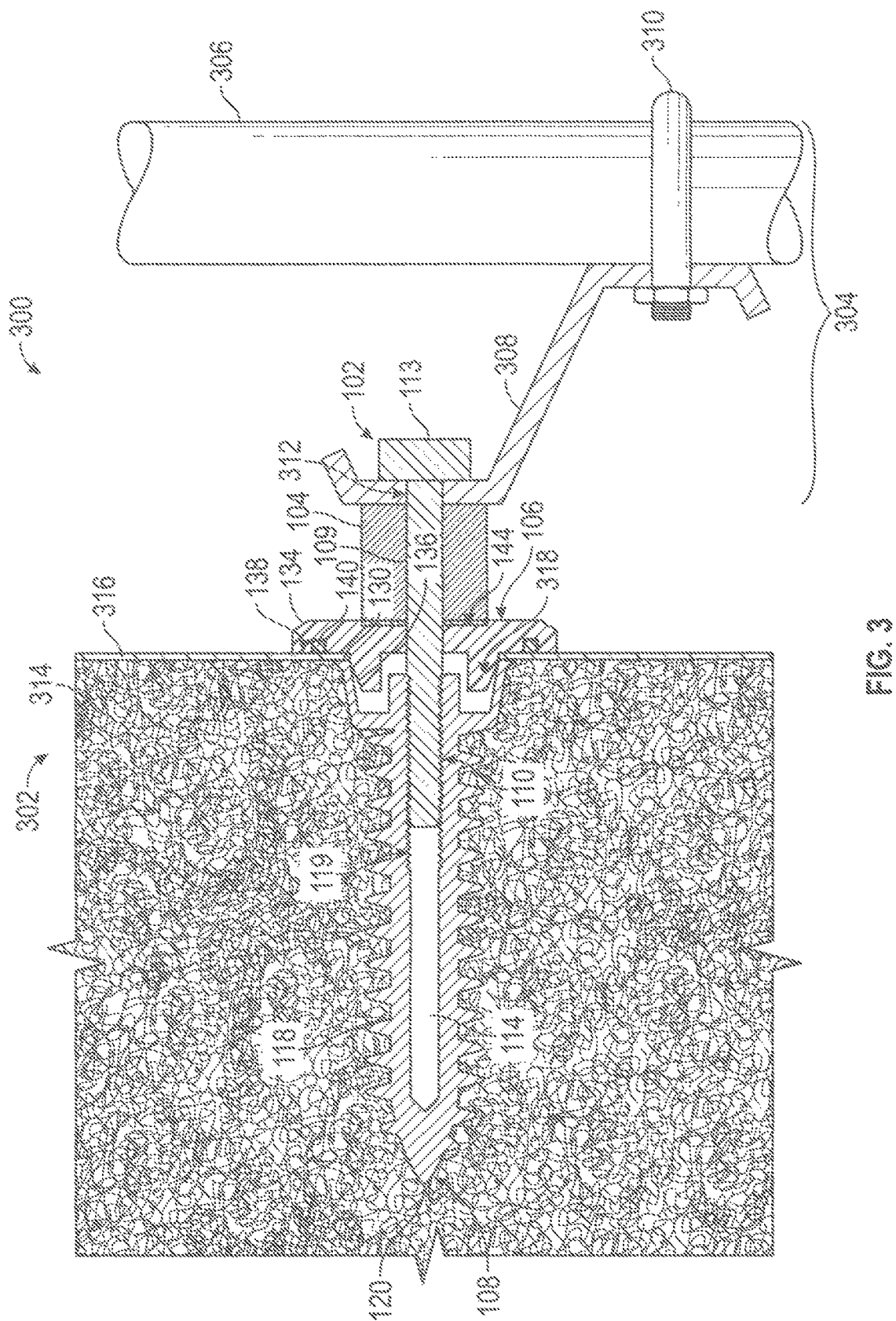
FIG. 3 is a cross-sectional side view of a wall mounting assembly attached to a wall panel, the wall mounting assembly including the fastener assembly of FIG. 1 and an exemplary mounting bracket or strut assembly, in accordance with certain embodiments.

Illustrative and exemplary embodiments of the invention are described in further detail below with reference to and in conjunction with the figures.

DETAILED DESCRIPTION

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

FIG. 1 is an exploded view of an exemplary fastener assembly 100 configured for mounting a supported element to an upright support, in accordance with embodiments. For example, as shown in FIG. 3, the fastener assembly 100 can be used to mount a strut member or other wall hanger comprising a surface for attachment to a pipe, conduit, or tube, to a wall or other vertical or generally vertical surface. In some cases, the fastener assembly 100 may be used to mount a strut member to a horizontal surface, such as a ceiling. In some embodiments, the fastener assembly 100 may be provided as a kit for mounting the assembly 100 to a wall and said kit may further include one or more tools configured to facilitate said installation, such as, for example, a driver (e.g., drill bit, ratchet, etc.) or other suitable tool. In an embodiment of the kit according to the present invention, each of the components described herein may be provided together, optionally in a package containing the collection of parts for a full assembly of the device or optionally in a collection of parts for multiple assemblies. The kit may include the parts for one or more assemblies, with tools used for installation and practice of the method described herein—such as a driver tool for inserting the anchor (such as a driver tool that may be attached to a power drill or ratchet—and may include a drill bit configured for boring a hole in the panel or laminate of the panel with suitable dimension and depth for inserting the anchor into the panel material and thereby securing the anchor within the panel.

As shown in FIG. 1, the fastener assembly 100 comprises a plurality of separate components that are configured (e.g., sized and shaped) to be assembled together to mount a strut member or other element to a wall or wall panel. The separate components include an elongated fastener 102, a spacer 104, a washer assembly 106, and an anchor 108. According to embodiments, the anchor 108 is configured to engage the wall panel, or be inserted into the wall panel. The washer assembly 106 is configured for coupling to both the anchor 108 and the wall panel. The spacer 104 is configured for attachment to the washer assembly 106, opposite the wall panel, and to the strut member. Optionally, the washer assembly may comprise an integral spacer body, thus optionally providing an assembly which need not include a separate spacer 104. The elongated fastener 102 is configured for securing all of the separate components together and to the wall panel. As shown in FIG. 3, a portion of the fastener assembly 100, including the spacer 104 and a portion of the washer assembly 106, is configured to remain exposed or protrude out from the wall panel after securing the fastener assembly 100 to the wall, and a remaining portion of the fastener assembly 100, including the anchor 108, is configured to extend into and attach to the internal thickness 314 of the wall panel 302.

In embodiments, the fastener assembly 100 is especially designed for use in locations that require a high degree of cleanliness, such as food processing plants and pharmaceutical manufacturing installations. For example, one or more components of the fastener assembly 100, such as, e.g., the anchor 108, can be specifically configured for secure fastening to a laminate foam wall panel typically used in food processing plants and other industrial-level, clean environments (e.g., as shown in FIG. 3). Such wall panels include a compressible, foam (or Styrofoam) interior which is difficult to grip with a conventional metal screw. Also, an extent of the fastener assembly 100 that remains exposed after installation can be configured to be generally without a horizontal surface, and thereby avoid collection of dust. As will be appreciated, exposed horizontal surfaces, such as those found in conventional wall mounting assemblies, can harbor contaminants including filth and mildew, as they tend to collect dust and debris along with water from wash downs.

In some embodiments, the areas of the fastener assembly 100 that remain exposed after installation are further configured to repel contaminants and to be easy to inspect and clean. For example, one or more of the exposed surfaces, such as, e.g., fastener 102 and/or spacer 104, may be made with stainless steel and polished to a #4 sanitary finish, or the like. As another example, the washer assembly 106 can be configured to create a tight seal with the wall panel, so as to prevent the formation of small gaps between the wall and the fastener assembly 100, as will be described in more detail below. It should be appreciated that small gaps or crevices, such as those found in conventional mounting assemblies, can be difficult to inspect and clean or allow water or cleaning solution to pass into the mounting area of the assembly and/or the opening in the wall panel that is needed for mounting. At the same time, the fastener assembly 100 is configured to hold the supported element (e.g., strut member) a predetermined distance away from the wall (see, e.g., FIG. 3), for example, using the spacer 104 (or upper spacer body of the washer assembly 102), with the predetermined distance being selected so that contaminants can easily fall downwards in the gap formed between the wall and the strut member. In conventional mounting assemblies, the strut member may be mounted so close to the wall that the gap formed therebetween is not easily inspectable or cleanable. Further, in conventional mounting assemblies, a gasket seal is not available for suitably sealing the external environment from the opening in the wall structure that is needed for mounting. In the present embodiment shown and described, the invention provides an enlarged diameter of a washer assembly 106 which includes a gasket (140, 240) to seal the surface engagement between the washer assembly 102 and the surface of the wall structure (316, 416).

These and other advantages of the fastener assembly 100 will become apparent based on the disclosure provided herein.

Referring back to FIG. 1, the separate components of the fastener assembly 100 will now be described in more detail. The spacer 104 and the washer assembly 106 each have a generally annular body that is configured to receive an extent of the elongated fastener 102 there through, such as, for example, first portion 109 shown in FIG. 1. In an embodiment, the spacer 104 is formed as an upper extending body of the washer assembly 106, either as a unified assembly or one of disassembled parts. Another extent of the fastener 102, such as, for example, second portion 110 shown in FIG. 1, is securely received by the anchor 108 (e.g., as shown in FIG. 3). In embodiments, an overall length of the elongated fastener 102 is selected so that, upon assembly, the fastener 102 extends through an open center 111 of the spacer 104, through an open center 112 of the washer assembly 106, and into a central passageway 114 of the anchor 108, leaving only a drive head 113 of the fastener 102 exposed or visible. In embodiments, the elongated fastener 102 may be a commercially-available metal bolt or screw, such as, for example, a hex bolt, a cap screw, a lag bolt, a button head bolt, a pan head bolt, or any other suitable style or type of fastener. The exact size or dimensions (e.g., body length, head diameter, etc.) of the fastener 102 may be selected based on one or more dimensions of the spacer 104 and/or other components of the fastener assembly 100, and/or one or more dimensions of a supported element attached to the fastener assembly 100, such as, e.g., the strut member shown in FIG. 3. As an example, the head 113 of the elongated fastener 102 may be a hex head, and the fastener 102 may have a diameter of 8-32, 10-32, ¼ inch, 5/16 inch, ⅜ inch, ½ inch (or similar metric sizes), and the length of the fastener 102 may be 2 inches, 2.5 inches, 3 inches, etc. In one preferred embodiment such as is shown in the Figures, the elongated fastener 102 is a Type 304 Stainless Steel Hex Bolt, or Hex Head Cap Screw, with a ⅜ inch diameter a body length of at least 2 inches and right hand national coarse threads (e.g., 16TPI).

As shown in FIG. 1, the first portion 109 of the elongated fastener 102 can have a plain or smooth surface, like the inner surfaces of the spacer 104 and the washer assembly 106, so that the first portion 109 can easily pass through and reside within the hollow portion 111 of the spacer 104 and the open center 112 of the washer assembly 106. As shown in FIG. 1, the second portion 110 has a threaded surface. The smooth, inner surfaces of the spacer 104 and the washer assembly 106 also allow the second, or remaining, portion 110 of the fastener 102 to easily pass there through, on its way to the anchor 108.

In embodiments, a length of the first portion 109 can be selected based on, or set substantially equal to, a length of the spacer 104 and an overall length of the washer assembly 106. In such cases, the first portion 109 can be housed entirely or substantially within the spacer 104 and the washer assembly 106 upon assembly, thus preventing a surface area of the first portion 109 of the fastener 102 from being exposed after coupling the fastener assembly 100 to a wall (e.g., as shown in FIG. 3).

Referring additionally to FIG. 2, shown is a cross-sectional view of the anchor 108 in accordance with embodiments. As illustrated, the anchor 108 has an elongated body 116 comprised of an outer wall 117 and helical threads 118 extending radially outward along an extent of the outer wall 117. The anchor 108 further includes a hollow center, or central passageway 114, formed within and extending substantially through an extent of the elongated body 116. The central passageway 114 has an open end 115 and is configured to securely receive, via the open end 115, the second portion 110 (a threaded shaft portion) of the elongated fastener 102. For example, at least a portion of the central passageway 114 includes a threaded surface 119 configured to engage the threaded shaft 110 of the fastener 102. In a preferred embodiment, the threads of the threaded surface 119 may be sized and shaped to match or correspond to the threads of the second portion 110 of the fastener 102. A length of the second portion 110 of the fastener 102 can be selected so that, upon assembly, the second portion 110 is entirely or substantially housed within the central passageway 114 of the anchor 108. This prevents a surface area of the second portion 110 of the fastener 102 from being exposed after coupling the fastener assembly 100 to a wall (e.g., as shown in FIG. 3).

Referring additionally to FIG. 3, shown is a cross-sectional view of a wall mounting assembly 300 coupled to a wall or wall panel 302, in accordance with embodiments. The wall mounting assembly 300 includes the fastener assembly 100 shown in FIG. 1 and a strut assembly 304 coupled to a supported element 306. The supported element 306 can be a pipe, conduit, tube, or the like. The strut assembly 304 includes a strut 308, or strut member, coupled to the fastener assembly 100 on one end and to the supported element 306 on the other end. The strut assembly 304 also includes a fastener 310 for securing the strut 308 to the supported element 306. The fastener 310 can be a U-bolt or any other suitable device for attaching the supported element 306 to the strut 308.

In embodiments, the strut 308 includes a hole 312 for receiving the elongated fastener 102 of the fastener assembly 100. The hole 312 may be pre-drilled into the strut 308, or formed (e.g., punched, drilled, etc.) on site at the time of mounting the strut assembly 304 to the wall 302, and optionally may be a slot type hole to allow for adjustability during assembly. The hole 312 can be configured to be smaller than the drive head 115 of the fastener 102 and at least large enough to receive the first portion 110 of the fastener 102. In a preferred embodiment, the hole 312 is configured to have a diameter that is substantially equal to the diameter of the first portion 110, so as to eliminate or minimize open space between the hole 312 and the first portion 110 of the fastener 102.

As shown in FIG. 3, the strut 308 can be configured to angle the supported element 306 away from the wall 302, or at least substantially parallel to the wall 302. In embodiments, the strut 308 may be substantially similar to the strut shown and described in U.S. Pat. No. 7,651,056, filed on Oct. 12, 2005 and entitled "Method of Mounting Support Assemblies for Pipes, Conduits, and Tubes," which has the same inventor as the present disclosure and is incorporated by reference herein in its entirety.

In embodiments, the wall 302 can be comprised of a thick, inner portion 314 (also referred to herein as an "internal thickness") overlaid by a thin panel 316 (also referred to herein as a "laminate outer cover"), as shown in FIG. 3. The inner portion 314 may be constructed of thick foam or foam board, or other sturdy, compressible material capable of being penetrated by the anchor 108, but also capable of at least partially supporting a weight of the wall mounting assembly 300 and the supported element 306. The thin panel 316 may be a laminate cover or sheet metal cladding made of stainless steel or other material suitable for highly sanitary installations. The laminate cover 316 may be attached to the inner portion 314 using adhesive or other suitable technique. In some embodiments, the thickness of the inner portion 314 can be, for example, between 4 and 8 inches, while the thin cover 316 residing adjacent thereto can be significantly thinner (e.g., like a skin), as shown in FIG. 3. As an example, the wall 302 may be an insulated wall panel sold by Kingspan®, such as the Mineral Fiber (MF) Fire Rated wall panel.

According to embodiments, one or more components of the anchor 108 can be configured to facilitate installation and/or insertion of the anchor 108 into the wall panel 302. For example, a distal end 120 of the anchor 108 may have a generally conical or tapered shape with a pointed and/or sharp tip to help create or bore a path through the thick foam as the anchor 108 is inserted into the inner portion 314 of the wall 302 during installation (see, e.g., FIGS. 15 and 16).

In addition, the anchor 108 preferably includes an extent of its length with helical threading 118 or similar auger outer arrangement, wherein the helical threading 118 is configured to cut through the compressible (or frangible) wall material without wandering (e.g., so as to move in a steady, straight line) and/or tearing. For example, the helical threads 118 can be formed of wide walls with thin, sharp edges spiraling around the outer wall 117, the edges being configured to cut through the compressible material of the inner wall portion 314 without tearing. In addition, an overall height of the helical threads 118 at one or more locations along the outer wall 117 can be selected so the threads 118 have a progressive or tapered profile. For example, the progressive thread profile along an extent of the length of the anchor 108 may be formed by gradually narrowing an overall height of the threads 118 as the threads 118 near the distal end 120, as shown in FIGS. 1 and 2. In some embodiments, the overall profile of the anchor 108 progressively narrows starting from a proximate end adjacent to the bottom end 128 of the upper crown 124 and ending at the distal end 120. In either case, the progressive thread profile can be configured so that the threads 118 gradually and steadily increase the size of the hole being formed through the compressible material as the anchor 108 travels deeper and deeper into the inner wall portion 314. Increasing the hole size in such a controlled manner can help prevent undesirable tearing of the compressible material and can guide the anchor 108 in a substantially straight line, or otherwise prevent the anchor 108 from wandering during insertion.

Furthermore, the anchor 108 can have a length configured to enable an extent of the outer wall 117 to be forced into and through the compressible material of the inner portion 314. In one exemplary embodiment, the anchor 108 has an overall length of about 3 to 4 inches (e.g., approximately 3.4 inches). This length plus the use of a sturdy, lightweight material (e.g., a hard plastic) and a progressive thread profile enable the elongated body 116 to be inserted, or screwed, into the inner portion 314 of the wall 302 with a controlled amount of resistance and torque. Further, the anchor 108 can include a drive head 122 configured for user engagement when forcing or inserting the elongated body 116 of the anchor 108 into the wall panel 302. As shown in FIG. 2, the drive head 122 can be coupled to the elongated body 116 adjacent the open end 115. The drive head 122 includes an opening in communication with the central passageway 114 for receiving the elongated fastener 102 there through.

The anchor 108 can also be configured to anchor or secure the remaining components of the fastener assembly 100 (also referred to herein as a "mounting assembly") to the wall panel 302, upon installation of the fastener assembly 100. For example, the helical threads 118 on the outer wall 117 of the anchor 108 can be configured to securely engage the foam board within the wall panel 302 to support the weight of the mounting assembly and any supported element coupled thereto. In some embodiments, the helical threads 118 can include course threading configured to firmly grip the compressible material of the wall panel 302 upon installation. Further, the anchor 108 can be made of a lightweight rigid material (e.g., plastic) to provide rigid outer threads 118 while providing compressible inner passageway 114 material when engaged with the rigid (metal) fastener 102.

Figure 4:
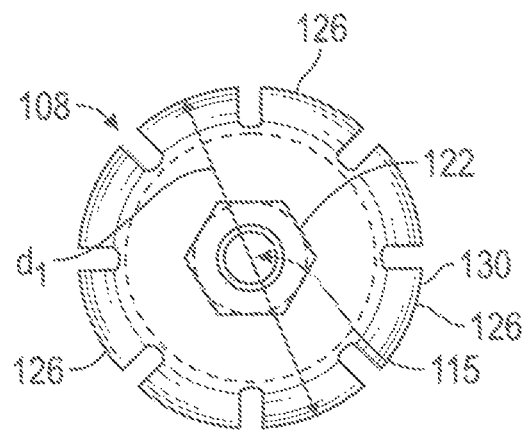
FIG. 4 is a top view of the wall anchor shown in FIG. 2, in a neutral position, in accordance with certain embodiments.

To further facilitate anchoring of the fastener assembly 100 to the wall panel 302, the anchor 108 includes an annular collar, or upper crown 124, arranged about the open end 115 of the central passageway 114 and the drive head 122. As also shown in FIG. 4, which is a top view of the anchor 108, the upper crown 124 comprises a plurality of circumferentially spaced elements 126 (e.g., fingers) that cooperate to form an outer crown diameter $d_o$ and give the crown 124 a generally castled shape. The crown elements 126 extend upwards from a base portion 128 of the crown 124. An extent of each crown element 126 also extends radially outward from a central axis of the base portion 128, so as to create an outwardly sloping wall around at least a portion of the crown 124. The extent of the crown elements 126 that slope or extend radially outwards can vary.

For example, in some embodiments, each crown element 126 ends at a substantially flat top rim 130 that is formed by a flange or protruding lip portion 132 extending radially outward from the rest of the element 126. In such cases, the outwardly sloping wall includes the sidewall that forms the protruding lip 132. In the exemplary embodiment of FIG. 2, the upwardly extending crown elements 126 also extend radially outwards, so that a longer portion of the crown wall (e.g., the entire length of the crown elements 426) forms the outwardly sloping wall. In another embodiment (for example, wall anchor 508 shown in FIGS. 15 and 16), the crown elements extend upward from, and generally perpendicular to, the base of the crown, so as to form a substantially straight crown wall. In such cases, only the protruding lip at the top rim of the crown elements forms the outwardly sloping crown wall. In yet another embodiment, the crown elements do not include the protruding lip, but an entire length of each crown element extends upwards and radially outwards from the base portion of the crown to form the outwardly sloping crown wall.

The following paragraphs will refer to the anchor 108 shown in FIGS. 1 and 2 to describe how the crown elements 124 move when a force is exerted on the crown 124. However, it should be appreciated that the same description/movement may apply to other embodiments of the wall anchor, such as, e.g., wall anchor 508 shown in FIGS. 15 and 16.

Referring back to FIG. 2, the top rim 130 has an inner diameter $d_i$ formed by the walls of the crown elements 126 and an outer diameter $d_o$ formed by the flange portion 132. In embodiments, the crown elements 126 are configured to move radially outward or radially inward in response to certain forces applied to the crown elements 126. These movements cause both the inner crown diameter $d_i$ and the outer crown diameter $d_o$ of the top rim 130 to be enlarged or reduced, respectively. For the sake of simplicity, the following examples will describe the change in the outer diameter $d_o$ of the top rim 130 during such movements. However, it will be appreciated that both diameters $d_o$ and $d_i$ may simultaneously change during these movements.

Figure 5:
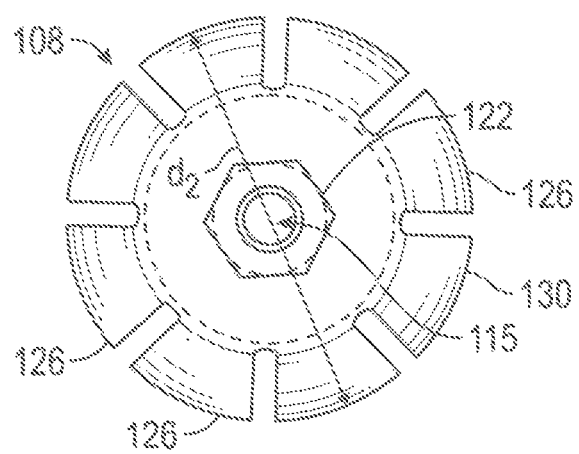
FIG. 5 is a top view of the wall anchor shown in FIG. 4, in an expanded position, in accordance with certain embodiments.
Figure 6:
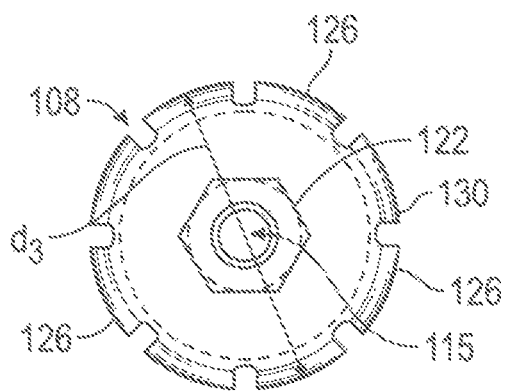
FIG. 6 is a top view of the wall anchor shown in FIG. 4, in a contracted position, in accordance with certain embodiments.

Referring now to FIGS. 4, 5 and 6, shown are top views of the anchor 108 to illustrate the changes in diameter of the top rim 130 during expansion and contraction of the crown 124 in response to forces applied to the crown elements 126, in accordance with embodiments. For example, FIG. 4 shows the crown 124 in a neutral or initial position, where the top rim 130 of the crown elements 126 has an initial diameter $d_1$. In FIG. 5, each of the crown elements 126 has been pushed or moved outwards radially, such that the diameter of the top surface 130 has been enlarged to a second diameter $d_2$ greater than the initial diameter $d_1$, thus placing the crown 124 in an expanded position. In FIG. 6, each of the crown elements 126 has been pressed or moved inwards, such that the diameter of the top surface 130 has been reduced to a third diameter $d_3$ smaller than the initial diameter $d_1$, thus placing the crown 124 in a contracted position.

In embodiments, the individual crown elements 126 move or deform in response to one or more forces applied to the crown 124 during installation of the anchor 108 into the wall panel 302. For example, in some embodiments, the crown elements 126 may be at least slightly compressed inwards towards the third diameter $d_3$ as the upper crown 124 passes through an opening 318 formed in the laminate outer cover 316 to receive the anchor 108. The compression of the crown elements 126 can be caused by, for example, selection of an opening size that is smaller than a diameter of the crown 124 (such as, e.g., the outer crown diameter $d_o$), such that the outwardly sloping crown elements 126 and/or the outwardly extending flange portion 132 are pressed inwards by the walls of the opening 318 as the crown 124 passes there through. In such cases, the reduced diameter $d_3$ may be substantially equal to, or less than, a diameter of the opening 318 that receives the crown 124. As another example, the crown elements 126 may be expanded toward the second diameter $d_2$ as a projection of the washer assembly 106 (see, e.g., projection 136 in FIG. 7) engages the crown elements 126 upon coupling the washer assembly 106 to the opening 318 in the wall panel 302, as described in more detail below. The expansion of the crown elements 126 can be caused by, for example, the size and shape of the washer projection as compared to the top rim 130. In such cases, the enlarged diameter $d_2$ may be substantially equal to or greater than a diameter of the washer projection inserted into the crown 124.

More specifically, in a preferred embodiment, the opening 318 is a substantially round hole cut from or drilled into the laminate cover 316 prior to installation of the fastener assembly 100. The opening 318 may have a characteristic diameter that is selected based on, or is determined by, a diameter of the anchor 108 and/or a diameter of the washer projection, as described in more detail below. In some embodiments, the characteristic diameter of the opening 318 is selected to be substantially equal to or greater than the inner crown diameter $d_i$ but smaller than the outer crown diameter $d_o$. As shown in FIG. 2, the outer diameter $d_o$ of the top rim 130 is at least slightly larger than the inner crown diameter $d_i$ due to the flange portion 132 extending out from the crown 124. Thus, making the opening 318 smaller than the outer crown diameter $d_o$ causes the crown elements 126 to be moved or pushed inward by the laminate cover which forms the sides of the opening 318, as the top rim 130 of the crown 124 is inserted into the opening 318 and until the flange portion 132 fits through the opening 318. Once the entire flange portion 132 passes through or clears the opening 318, the crown elements 126 move or spring back to their neutral positions, so that the outer diameter $d_o$ of the top rim 130 (e.g., initial diameter $d_1$) is restored. Thus, once fully inserted, the outer diameter of the crown 124 resides completely within the opening 318. In one exemplary embodiment, the outer diameter $d_o$ of the crown 124 is about 1.2 to 1.25 inches, while the inner diameter $d_i$ is about 1.1 to 1.15 inches.

Figure 7:
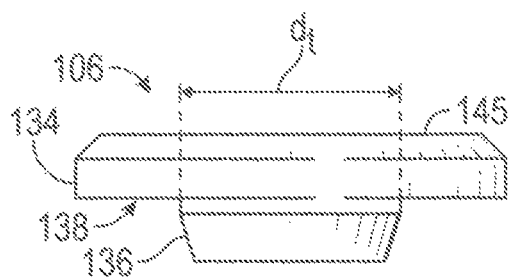
FIG. 7 is a side view of an exemplary washer assembly included in the fastener assembly of FIG. 1, in accordance with certain embodiments.

As mentioned above, the crown elements 126 may also move in response to engaging with the washer assembly 106. As shown in FIGS. 1 and 7, the washer assembly 106 includes a main washer body 134 (also referred to herein as a "washer") with a projection 136 depending or extending down from an underside 138 of the washer 132. The washer assembly 106 is coupled to the wall panel 302 and the anchor 108 by inserting the projection 134 through the opening 318 until the underside 138 of the washer 132 approaches and preferably engages an exterior surface of the laminate cover 316, as shown in FIG. 3. The projection 136 has a beveled or inwardly sloping wall that is configured to engage with the anchor crown 124 (also referred to herein as a "mating portion" of the anchor 108), as the washer assembly 106 is inserted through the opening 318. As shown in FIG. 7, the beveled walls can extend from a cylindrical portion of the projection 136 that has a top diameter $d_t$ and is adjacent to the underside 138 of the washer 134. In embodiments, the top diameter $d_t$ is larger than the inner crown diameter $d_i$, but smaller than the outer crown diameter $d_o$. Thus, as the projection 136 is forced into the crown 124, the beveled walls of the projection 136 engage with and press against an inside of the top rim 130, such that the crown elements 126 are pushed in a radially outward direction, along the underside of the laminate cover 316, and the outer crown diameter $d_o$ is enlarged (e.g., to the second diameter $d_2$ shown in FIG. 5). The crown elements 126 keep moving outwards until the projection 136 is substantially inside the crown 124, or the top diameter $d_t$ is adjacent the top rim 130.

Once the washer 134 is inserted into the anchor crown 124, the crown elements 126 attached to the washer projection 136 as a ferrule. That is, the crown 124 exerts an inward pressure on the projection 136 as the crown elements 126 try to contract back to the initial position of the top rim 130 (e.g., initial diameter $d_1$ shown in FIG. 1). This pressure causes the crown elements 126 to deform around and grasp onto the projection 136, thus strengthening or securing the connection between the washer 134 and the anchor 108. At the same time, the cylindrical top of the projection 136 continues to exert an outward pressure on the crown elements 126, which maintains an expanded outer diameter of the crown 124 and thereby keeps the top rim 130 of the anchor crown 124 engaged with an underside of the laminate outer cover 316 adjacent to and surrounding the opening 318, as shown in FIG. 3. Such engagement of the crown 124 with the underside of the laminate cover 316 adjacent an outer rim of the opening 318, prevents the anchor 108 from being pulling out from the wall 302, or otherwise slipping back through the opening 318, thus securing the fastener assembly 100 to the wall panel 302.

In some embodiments, the characteristic diameter of the opening 318 is selected based on the top diameter $d_t$ of the washer projection 136. For example, the opening 318 may be substantially equal to or greater than the top diameter $d_t$ of the projection 136 in order to fit the washer projection 136 into the opening 318. In an embodiment, a kit of the present invention includes a boring device, such as a forester drill bit, dimensioned to be compatible with the washer dimensions.

Figure 8:
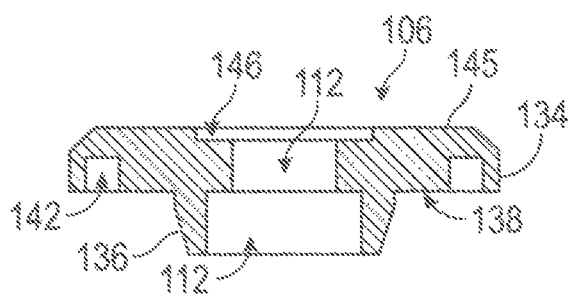
FIG. 8 is a cross-sectional side view of an exemplary washer included in the washer assembly of FIG. 7, in accordance with certain embodiments.
Figure 9:
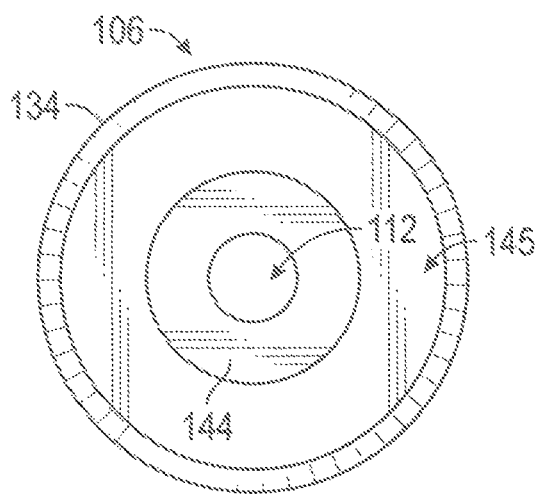
FIG. 9 is a top view of the washer assembly shown in FIG. 7, in accordance with certain embodiments.
Figure 10:
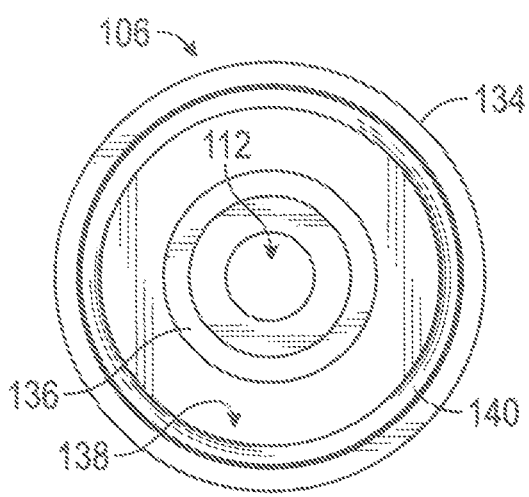
FIG. 10 is bottom view of the washer assembly shown in FIG. 9, in accordance with certain embodiments.

Referring additionally to FIGS. 7-10, shown are various views of the washer assembly 106, in accordance with embodiments. The washer assembly 106 includes a compressible gasket 140 (e.g., an O-ring or other elastomer), shown in FIG. 1, configured to mate with a recess, an annular groove or channel 142, formed on the underside surface 138 of the washer 134, as shown in FIG. 8. The gasket 140 may be configured (e.g., sized and shaped) to fit within a depth of the recess or channel 142 using a compression fit connection or the like. In an alternate embodiment, the compressible gasket may be mated with at least a portion of the lower surface of the washer body, without the need for a recess or channel, such as with use of mating friction fit, molding or adhesive. The compressible gasket 140 is further configured to engage with an outer surface of the laminate cover 316 once the washer assembly 106 is coupled to the wall panel 302 and compressed to form a seal, as shown in FIG. 3. In embodiments, the gasket 140 operates to create a secure engagement or seal between the underside surface 138 of the washer assembly 106 and the outer surface of the laminate cover 316. This seal may be substantially waterproof and dustproof, thus further enhancing the suitability of the fastener assembly 100 for highly clean environments.

The washer assembly 106 further includes a thin, compressible washer or disk 144 configured to reside between the washer 134 and the spacer 104. As shown in FIG. 7, a top surface 145 of the washer 134 includes a mating surface, preferably of a flat groove, recess, or channel 146, configured (e.g., sized and shaped) to receive the compressible washer 144 and the spacer 104 therein. The recess or flat groove 146 may have an outer upstanding wall with a height that is selected in order to accommodate the compressible washer 144 as well as a bottom portion of the spacer 104. Placing the spacer 104 into the flat groove 146 of the washer 134 and inserting the compressible washer 144 therebetween can prevent slippage and create a tight, secure seal between the spacer 104 and the washer 134.

In one alternative embodiment, the spacer 104 is fixedly attached to the washer 134, such that the spacer 104 and washer 134 form a single unit. In another alternative embodiment, the fastener assembly 100 does not include the spacer 104. Instead, the strut member 308 is attached directly to the washer assembly 106 using the elongated fastener 102.

In some embodiments, the spacer 104 and/or the washer assembly 106 can be made in various sizes to accommodate different types of installations or use cases. For example, the spacer 104 may be made available in different widths and/or lengths, and the washer 134 may be made available in different diameters.

Figure 14:
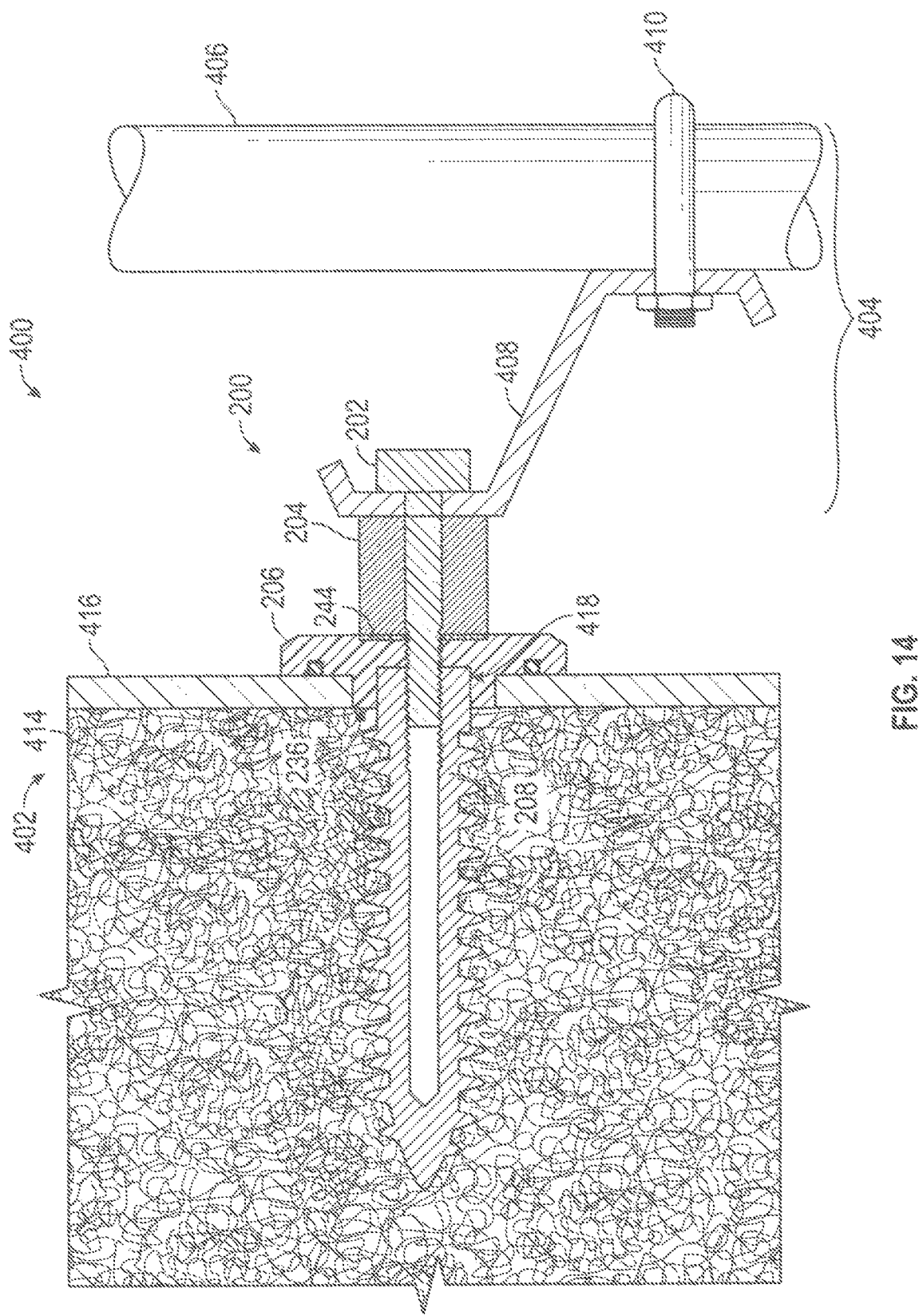
FIG. 14 is a cross-sectional side view of an exemplary wall mounting assembly attached to a wall panel, the wall mounting assembly including the fastener assembly of FIG. 12 and an exemplary mounting bracket or strut assembly, in accordance with certain embodiments.

FIGS. 12-14 illustrate another exemplary fastener assembly 200, in accordance with embodiments. The fastener assembly 200 is at least somewhat similar to the fastener assembly 100 shown in FIG. 1, though not having an upper crown of the anchor and mating projection of the washer assembly. For example, as shown in FIG. 12, the fastener assembly 200 includes an elongated fastener 202, a spacer 204, and a washer assembly 206 comprising a main washer body 234, a compressible gasket 240 for forming a seal with a wall panel, and a thin, compressible washer 244 for coupling between the washer 234 and the spacer 204, all of which is substantially similar to the corresponding components of the fastener assembly 100.

The fastener assembly 200 also includes an anchor 208 with an outer wall 217 having a generally helical arrangement 218 projecting radially outwards along an extent of the wall 217, similar to the anchor 108 shown in FIG. 1. As shown in FIG. 13, the anchor 208 also includes a central passageway 215 comprising a threaded surface 219 for securely receiving the fastener 208 within the anchor 208, and a pointed bottom end 220 opposite a drive head 222 at a top end of the anchor 208.

FIG. 14 shows a wall mounting assembly 400 coupled to a wall panel 402, in accordance with embodiments. The wall panel 402 includes a thickness 414 of compressible material (e.g., foam) and a thin laminate cover 416 (e.g., stainless steel cladding). The wall mounting assembly 400 includes the fastener assembly 200 and a strut assembly 404 configured to carry a pipe, conduit, or tube, like the strut assembly 304. The strut assembly 404 is coupled to the wall panel 402 using the fastener assembly 200.

As shown, the anchor 208 is configured for insertion into the compressible material 414 of the wall panel 402. Like the anchor 108, the threaded arrangement 218 of the anchor 208 is configured to engage with and grip the compressible material 414, thus prevent slippage or movement once installed within the wall 402.

The fastener 202 is configured to secure all of the separate components—strut member 408, spacer 204, washer assembly 206, and anchor 208—together and to the wall panel 402, as shown in FIG. 4. In embodiments, an opening or hole 418 is formed in the wall panel 402 to receive the anchor 208 and an extent of the washer 234. The washer 234 includes a projection 236 with an open cavity for receiving an extent of the anchor drive head 222 upon coupling the washer 234 to the wall panel 402, as shown in FIG. 14. The opening 418 may be configured (e.g., sized and shaped) to receive the washer projection 236. A flange portion of the washer 234 engages an outer surface of the wall panel 402 and includes a compressible gasket 240 (e.g., O-ring) for creating a tight seal between the washer 234 and the laminate cover 416. The spacer 204 and a compressible washer 244 are coupled to a flat groove on a top surface of the washer 234, opposite the gasket 240. The spacer 204 is coupled to a strut member 408 using the fastener 202.

Figure 15:
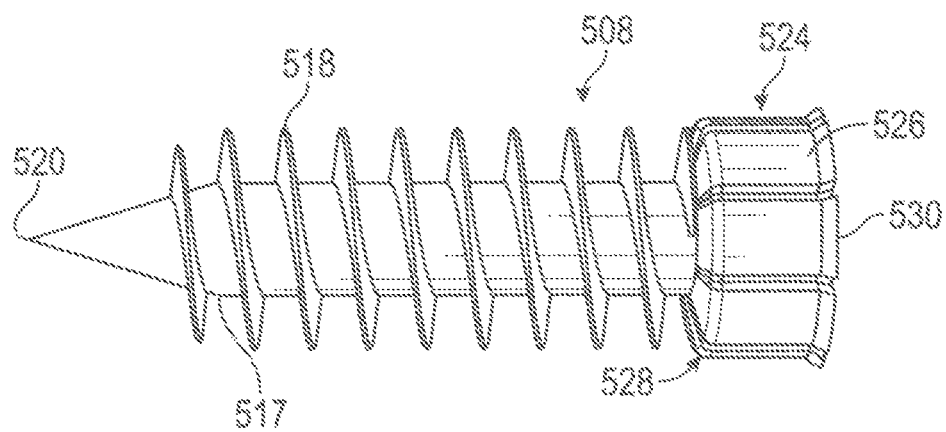
FIG. 15 is a side view of an exemplary wall anchor in according with certain embodiments.
Figure 16:
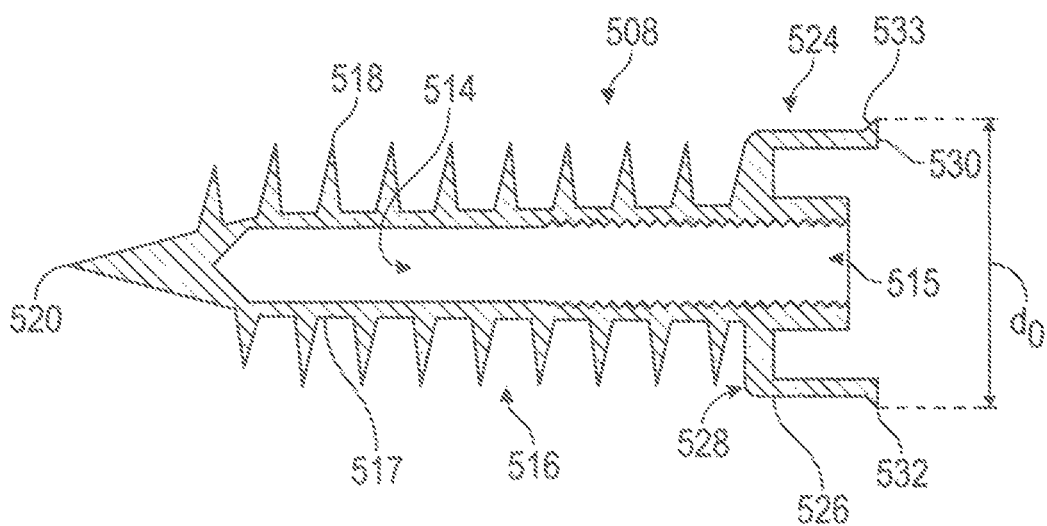
FIG. 16. is a cross-sectional view of the wall anchor shown in FIG. 15, in accordance with embodiments.

FIG. 15 illustrates an exemplary wall anchor 508 in accordance with certain embodiments. FIG. 16 illustrates a cross-sectional view of the wall anchor 508. As shown, the wall anchor 508 is similar to the wall anchor 108 shown in FIGS. 1 and 2. For example, like the wall anchor 108, the wall anchor 508 has an elongated body 516 comprised of an outer wall 517 and helical threads 518 extending radially outward along an extent of the outer wall 517. The anchor 508 further includes a hollow center, or central passageway 514, formed within and extending substantially through an extent of the elongated body 516. The helical threads 518 are formed by wide, substantially flat walls with thin, sharp edges that spiral around the outer wall 517 of the anchor 508 and create a progressive profile starting from the bottom, adjacent a distal end 520 of the wall anchor 508 and ending at the top of the threads. Also like the wall anchor 108, the wall anchor 508 includes an upper crown 524 that has a generally annular shape and is arranged about an open end 515 of the central passageway 514. The upper crown 524 comprises a plurality of circumferentially spaced wall elements 526 that cooperate to form an outer crown diameter $d_o$, the top end of each wall element 526 forming a top rim 530 with a flange portion 532 extending out from the rest of the wall element 526 in a substantially perpendicular direction.

The wall anchor 508 differs from the wall anchor 108 in that (1) the end 520 of the wall anchor 508 has a pilot tip that is more pointed and elongated than the end 120 of the wall anchor 108 shown in FIGS. 1 and 2, and (2) the crown elements 526 of the wall anchor 508 extend upward from a base portion 528 of the crown 524 in a substantially straight manner, unlike the outwardly sloping crown walls 126 of the wall anchor 108 shown in FIGS. 1 and 2.

More specifically, the pilot tip end 520 of the wall anchor 508 preferably has an elongated tapered or conical shape which is longer and more pointed or sharper that other embodiments, dimensioned to provide a pilot end to bore a straight path through compressible material of a support wall (e.g., wall 302 shown in FIG. 3) during installation. For example, a length of the conical end 520 and a slope of the walls that form the conical end 520 may be selected to better facilitate boring or piercing through the compressible material and thereby serve as a pilot to guide straight insertion of the anchor. In one exemplary embodiment, the conical end 520 has a length of about 0.5 to 1 inch (e.g., approximately 0.85 inch), while the remainder of the elongated body 516, or the extent carrying the helical threads 518, has a length of about 1.8 to 2.5 inches (e.g., approximately 2 inches), and the crown 524 has a length of about 0.5 to 0.75 inch (e.g., approximately 0.56 inch).

In some embodiments, a sloping profile of the conical end 520 mates with, or is a continuation of, a sloping profile of the helical threads 518. For example, the sloping profile may be aligned with a progressive width of the threading 518 so the elongated anchor body 516 has an extent that progressively narrows or tapers from top to bottom. In other embodiments, only a lower portion of the thread profile may be tapered to mate with the sloping profile of the conical end 520, for example, as shown in FIGS. 15 and 16. According to embodiments, the progressive profile of the anchor 508, coupled with the overall length of the anchor 508, and the use of a sturdy, lightweight material to manufacture the anchor 508, enables the anchor 508 to be forced into compressible material of a support wall (e.g., wall 302 shown in FIG. 3) with a modest and controlled amount of force, and guided by the pilot tip to pass generally straight along a generally linear path, thus avoiding excessive tearing of the compressible material or wandering off the intended path of insertion.

FIGS. 15 and 16 also show an embodiment of the upper crown whereby the crown elements 526 have substantially straight or upright walls, except for the flange or protruding lip 532 of the terminal end, i.e., the top rim 530. The top rim 530 extends out from the rest of the crown element 526 in a substantially perpendicular direction. The flange portion 532 is formed by a sidewall 533 that slopes outwards, or extends radially, from the crown element 526, and ends at the top rim 530. The upper crown 524 may otherwise operate in a substantially similar manner as the crown 124 described above and shown in FIGS. 1 and 2. For example, as shown in FIG. 16, the top rim 530 of the crown elements 526 may have an outer diameter $d_o$ formed by the outer edges of the flange portions 532. An opening in a support wall (e.g., opening 318 shown in FIG. 3) may have a diameter that is smaller than at least the outer diameter $d_o$. Thus, as the crown 524 passes through the wall opening, at least a portion of each crown element 526, including the sloped sidewall 533, may be compressed inwards until the top rim 530 clears the wall opening. Further, the crown elements 526 may be expanded or pressed outwards upon insertion of a washer (e.g., washer 134 shown in FIG. 1) into the crown 524, as described above.

Figure 17:
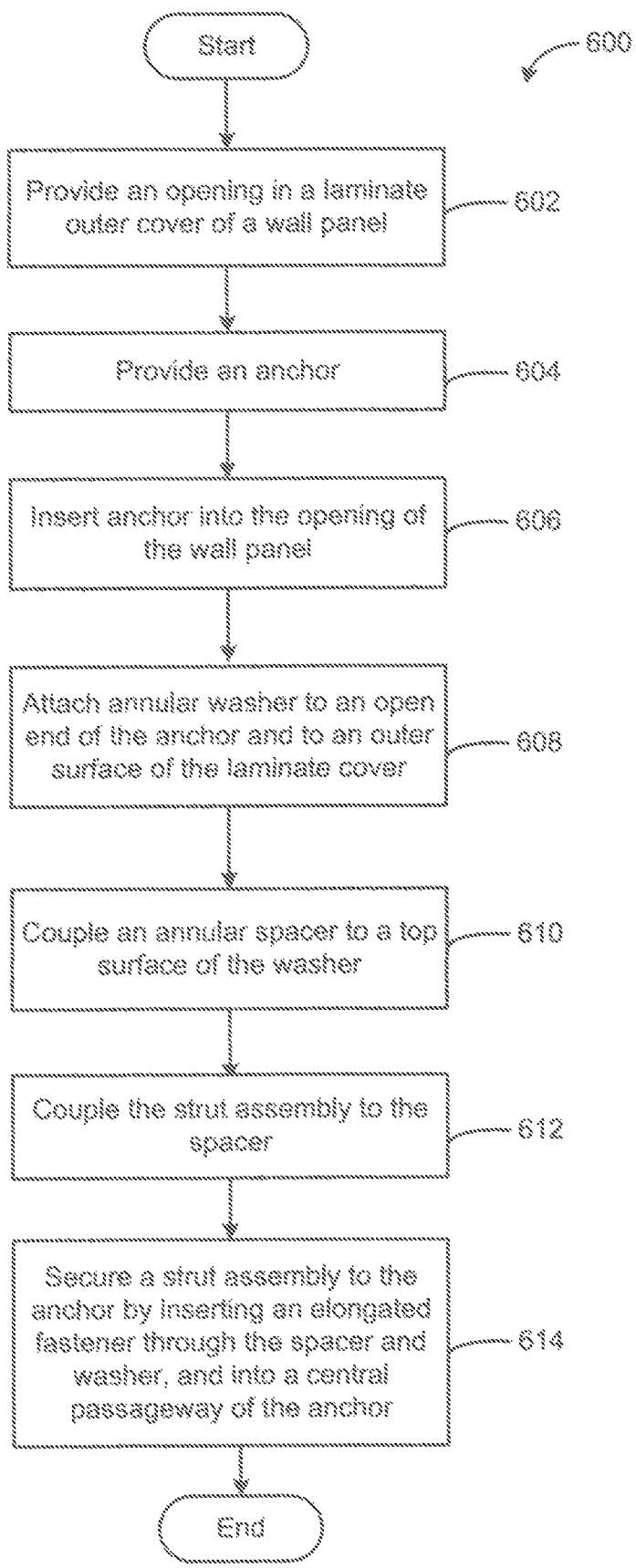
FIG. 17 is flow diagram for an exemplary method of mounting a supported element to a wall structure, in accordance with certain embodiments.

FIG. 17 illustrates an exemplary method 600 of mounting a supported element to a wall structure having a laminate outer cover and thickness comprised of compressible material, in accordance with embodiments. As an example, the method 600 may be used to mount a strut assembly coupled to a pipe, conduit, or tube (e.g., strut assembly 304 shown in FIG. 3) to a laminate foam wall panel (e.g., wall panel 302 shown in FIG. 3) using a fastener assembly (e.g., fastener assembly 100 shown in FIG. 1).

As shown, the method 600 may begin at step 602 with providing an opening (e.g., opening 318 shown in FIG. 3) in a laminate outer cover of the wall structure, the opening having a characteristic diameter. The characteristic diameter may be selected based on one or more attributes of the fastener assembly, such as, for example, a diameter associated with a washer projection (e.g., projection 136 shown in FIG. 7) and/or a diameter associated with an anchor crown (e.g., crown 124 shown in FIG. 1). Thus, in some embodiments, the step of providing an opening in the laminate cover includes forming a hole in the laminate cover sized to receive at least one of the mating portion (e.g., crown 124) of the anchor or the washer projection. The opening may be pre-drilled or may be created during installation of the mounting assembly.

At step 604, an anchor (e.g., anchor 108 shown in FIG. 1) having a generally cylindrical elongated body with a central passageway (e.g., passageway 114 shown in FIG. 2) and an open end (e.g., open end 115 shown in FIG. 2) is provided. The anchor body (e.g., elongated body 116) has a sidewall (e.g., outer wall 117 shown in FIG. 1) with a generally helical arrangement (e.g., threads 118 shown in FIG. 1)

projecting radially outward along an extent of the sidewall. In embodiments, the generally helical arrangement of radially outward projections forms an outer threading (e.g., as shown in FIG. 1) for gripping or engaging with the compressible material of the wall panel.

At step 606, the anchor is inserted into the opening of the laminate cover to secure the anchor to the wall structure. This step can include threading the anchor into the wall structure by turning the anchor body to force an extent of the anchor body into compressible material of the wall structure. In some embodiments, the anchor includes an upper crown (e.g., crown 124 shown in FIG. 2) arranged about the open end of the central passageway and comprising a plurality of circumferentially spaced elements (e.g., crown elements 126 shown in FIG. 1) cooperating to form an outer crown diameter (e.g., diameter $d_o$ shown in FIG. 2). In such cases, the step of inserting said anchor into the wall structure includes causing the crown elements to deform radially inward and reduce the outer crown diameter (e.g., to the contracted diameter $d_3$ shown in FIG. 6) as the upper crown passes through the opening, and spring back to the outer diameter once the upper crown clears the opening. Once inside the wall panel, a top rim (e.g., top rim 130) of the anchor crown is positioned against an underside of the laminate cover.

At step 608, an annular washer (e.g., washer assembly 106 shown in FIG. 1) is attached to the open end of the anchor and against an outer surface of the laminate cover of the wall structure. In embodiments, attaching the annular washer includes inserting a projection (e.g., washer projection 136 shown in FIG. 7) depending from the washer into a mating portion of the anchor. The mating portion of the anchor can include the upper crown (e.g., crown 124 shown in FIG. 2). Attaching the washer can further include the steps of engaging said washer projection with said crown elements, and forcing the projection against the crown elements to enlarge the outer crown diameter (e.g., expanded diameter $d_2$ shown in FIG. 5). According to some embodiments, the step of forcing the projection against the crown elements can include causing an extent of the upper crown to move radially outward and into a position adjacent to an underside of the laminate cover of the wall structure (e.g., as shown in FIG. 3). For example, the crown elements may be pushed into an expanded position by the washer projection, such that the crown elements are arranged around or outside a perimeter of the opening.

Figure 11:
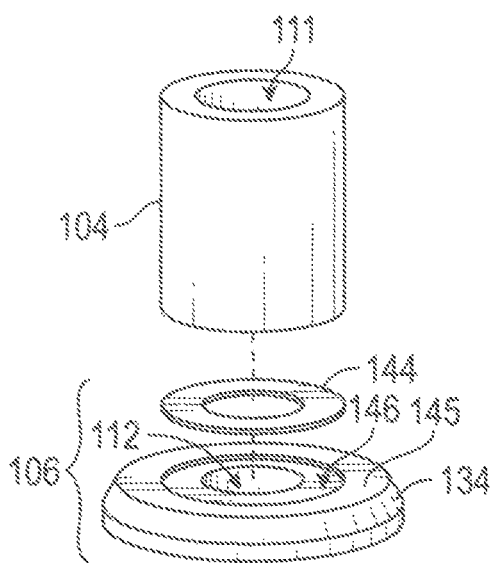
FIG. 11 is an exploded perspective view of an exemplary spacer and the exemplary washer assembly included in the fastener assembly of FIG. 1, in accordance with certain embodiments.

At step 610, after at least partially securing the anchor to the wall structure, an annular spacer (e.g., spacer 104 shown in FIG. 1) is coupled to a top surface of the washer (e.g., top surface 145 shown in FIG. 11). For example, the spacer may be inserted into a flat groove (e.g., groove 146 shown in FIG. 11) on the top surface of the washer, the groove being configured to receive an extent of the spacer. In some embodiments, coupling the spacer also includes placing a thin, compressible washer (e.g., thin washer 144 shown in FIG. 11) into the flat groove before attaching the spacer, in order to more securely engage the spacer to the washer.

At step 612, a strut assembly (e.g., strut assembly 304 shown in FIG. 3) is coupled to the spacer, or placed against the spacer, opposite the washer assembly. At step 614, the strut assembly is secured to the anchor by inserting an elongated fastener into said passageway of the anchor to mechanically secure the strut assembly into place adjacent the wall structure. In embodiments, securing said strut assembly includes inserting the elongated fastener through the spacer and the washer and securely fastening a threaded arrangement of the fastener within the central passageway of the anchor to mechanically secure the spacer, washer, and anchor together as an assembly. The method 600 may end once the strut assembly is secured to the wall panel.

Figure 18:
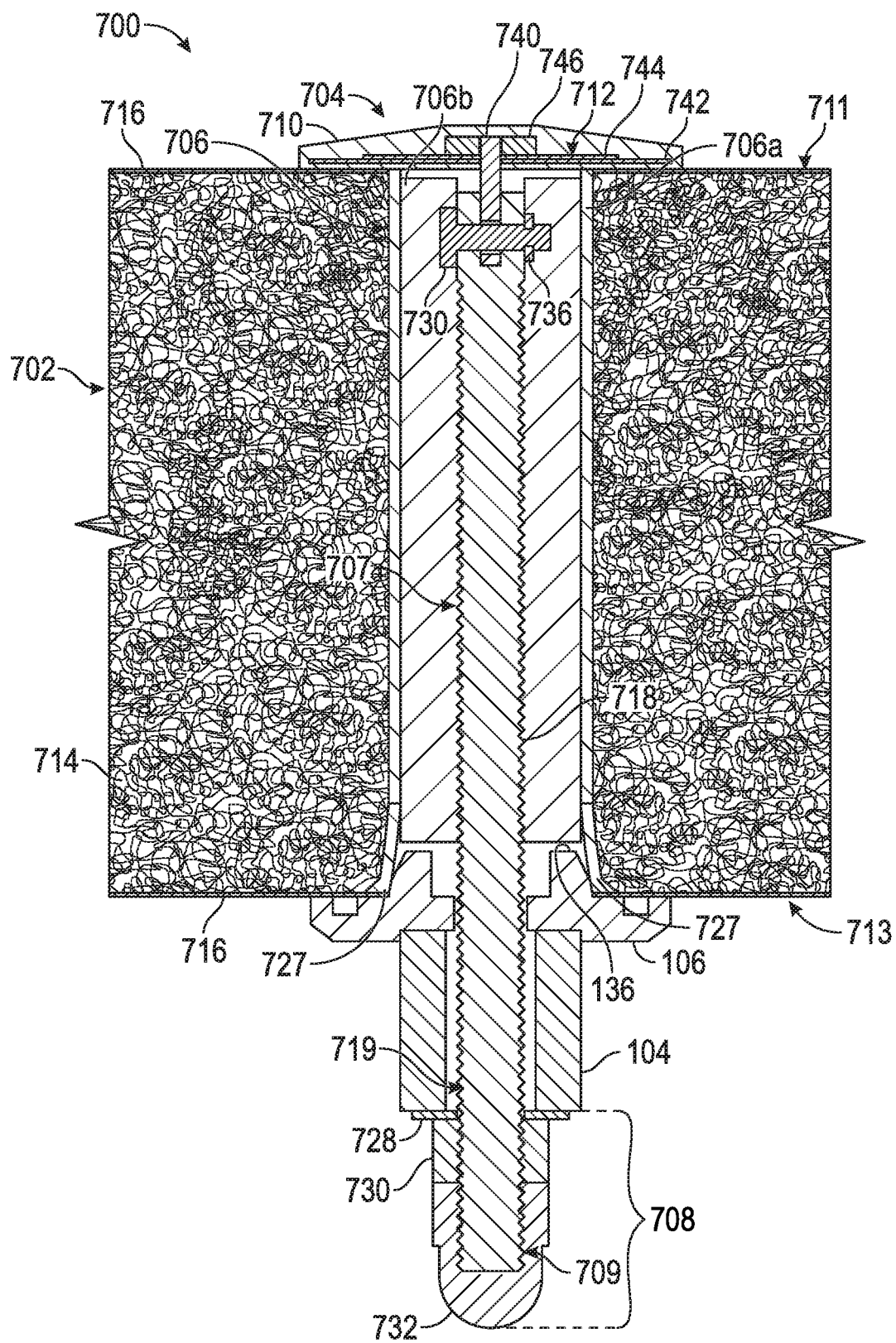
FIG. 18 is a cross-sectional side view of another exemplary fastener assembly attached to a wall panel, in accordance with certain embodiments.

FIG. 18 illustrates a cross-sectional view of another exemplary fastener assembly 700 coupled to a wall panel 702, in accordance with embodiments. In certain embodiments, the fastener assembly 700 may be configured for optimally handling tension applications, such as, e.g., a supported element hanging from a ceiling, while the fastener assembly 100 shown in FIG. 1 may be configured to better withstand shear loads, such as, e.g., a supported element mounted to a vertical wall. Moreover, the fastener assembly 700 may be configured for attachment to both sides of a support structure, while only requiring user access to one side of the structure during installation.

As shown, the fastener assembly 700 includes a toggle anchor assembly 704 configured to extend through the entire wall panel 702, a sheath 706 surrounding a middle extent 707 of the toggle anchor assembly 704 that resides within the wall panel 702, and an end assembly 708 coupled to an end portion 709 of the toggle anchor assembly 704. The toggle anchor assembly 704 includes a flexible cap 710 opposite the end portion 709. The flexible cap 710 is positioned adjacent to a first surface 711 (also referred to herein as "back side" or "distal side") of the wall panel 702 and encapsulates a spring washer assembly 712 of the toggle anchor assembly 704. The fastener assembly 700 also includes the washer assembly 106 (as shown in FIGS. 7-11) and the spacer 104 (as shown in FIG. 11). The washer assembly 106 may be coupled to the toggle anchor assembly 704 adjacent to a second surface 713 (also referred to herein as "front side" or "proximal side") of the wall panel 702 that is opposite the first surface 711. In addition, a first end of the washer assembly 106 may be coupled to the sheath 706 residing within the wall panel 702, while an opposite end of the washer assembly 106 may be coupled to the spacer 104.

Though not shown in FIG. 18, the fastener assembly 700 may be coupled to one or more strut assemblies for carrying or supporting one or more supported elements, such as, e.g., a pipe, conduit, tube, etc., for example, as shown FIGS. 3 and 14. The strut assembly may be coupled to a receiving portion of the fastener assembly 700, such as, e.g., a portion of the threaded fastener 718 between end 709 and portion 719. The various components of the fastener assembly 700 may be configured to withstand the weight of the supported elements and/or strut assemblies and any force exerted by the same, without causing damage to or weakening the wall panel 702 (e.g., via buckling, cracking, breakage, spaulding, etc.). As an example, the toggle anchor assembly 704 may be configured to provide good tensile strength against the back side 711 of the wall panel 702, while the washer assembly 106 and sheath 706 combination may be configured to provide good shear strength against the front side 713 of the wall panel 702.

In the illustrated embodiment, the wall panel 702 is shown in a horizontal position because it forms part of a ceiling or other horizontal support structure. In other embodiments, the wall panel 702 may be placed in vertical position to form part of a wall or other vertical support structure, for example, like the wall 302 shown in FIG. 3 and the wall 402 shown in FIG. 14. In embodiments, the wall panel 702 may be comprised of a thick, inner portion 714 (also referred to herein as an "internal thickness") constructed to thick foam or foam board, or other sturdy, compressible material, similar to the wall panel 302 shown in FIG. 3. The inner portion 714 may be overlaid by a thin panel 716 (also referred to herein as a "laminate outer cover"), such as a laminate cover or sheet metal cladding made of stainless steel, similar to the thin panel 316 shown in FIG. 3. In some cases, the thin panel 716 appears on both sides 711 and 713 of the wall panel 702, as shown in FIG. 18. In other cases, the thin panel 716 may be placed on only side of the wall panel 702, such as, e.g., the front side 713. The thickness of the wall panel 702 may be, for example, four to eight inches, while the thin panel (not shown) may be significantly thinner (e.g., like a skin). As an example, the wall 702 may be an insulated wall panel sold by Kingspan®, such as the Mineral Fiber (MF) Fire Rated wall panel.

Figure 21:
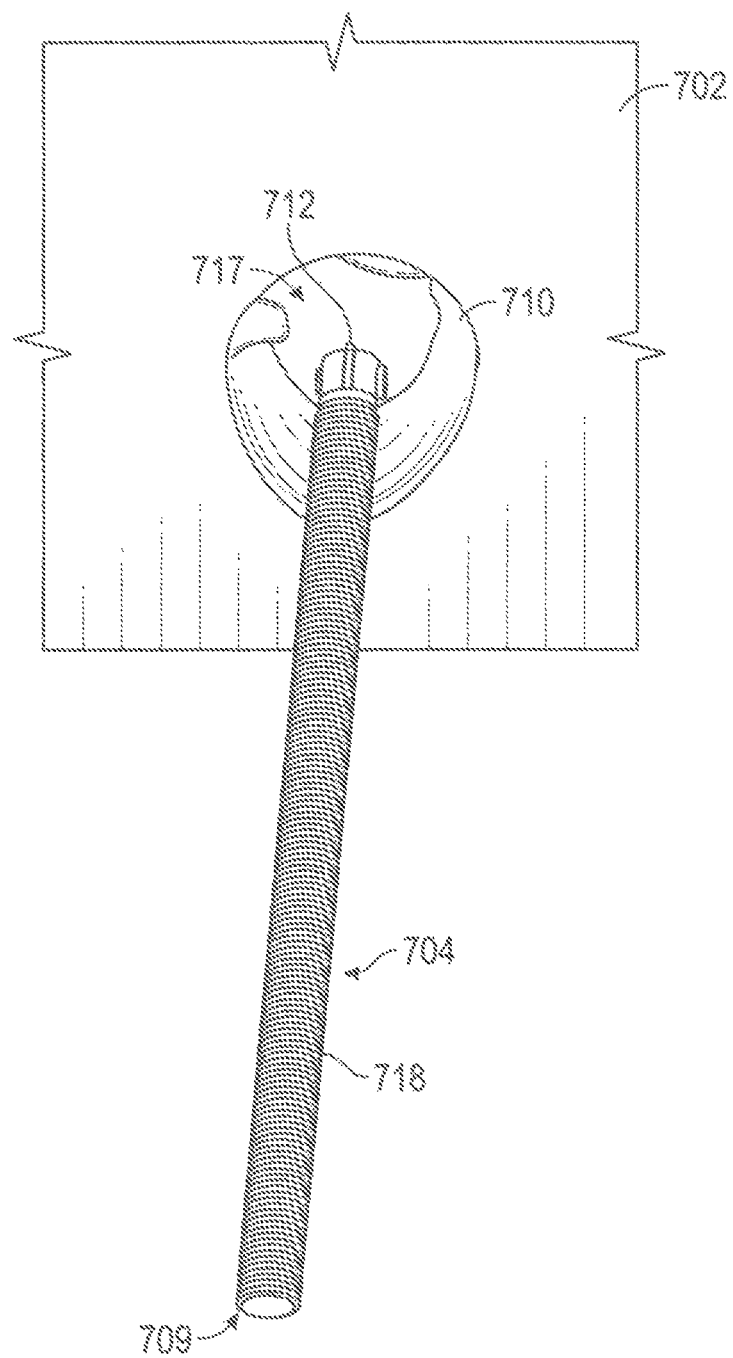

In embodiments, to install the fastener assembly 700 on the wall panel 702, an opening or hole 717 may be formed through the wall panel 702 first. The hole 717 may be created, for example, by first piercing the thin panel 716 on the front side 713, then boring or drilling through the inner portion 714 to remove the compressible material therein (as shown in FIG. 21), and finally drilling through the thin panel 716 on the back side 711, if any. In certain embodiments, a size or diameter of the hole 717 may be selected based on sizes of one or more components of the fastener assembly 700, such as, e.g., the washer assembly 106 and/or the sheath 706. In one example embodiment, the hole 717 has a diameter between 1 inch and 1.25 inch.

Figure 19:
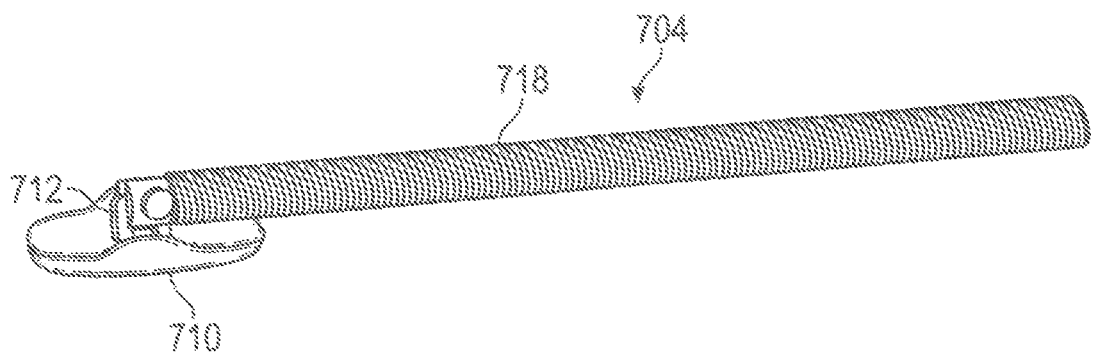
FIGS. 19 through 24 are various perspective views of an exemplary installation process for attaching the fastener assembly of FIG. 18 to a wall panel, in accordance with certain embodiments.
Figure 20:
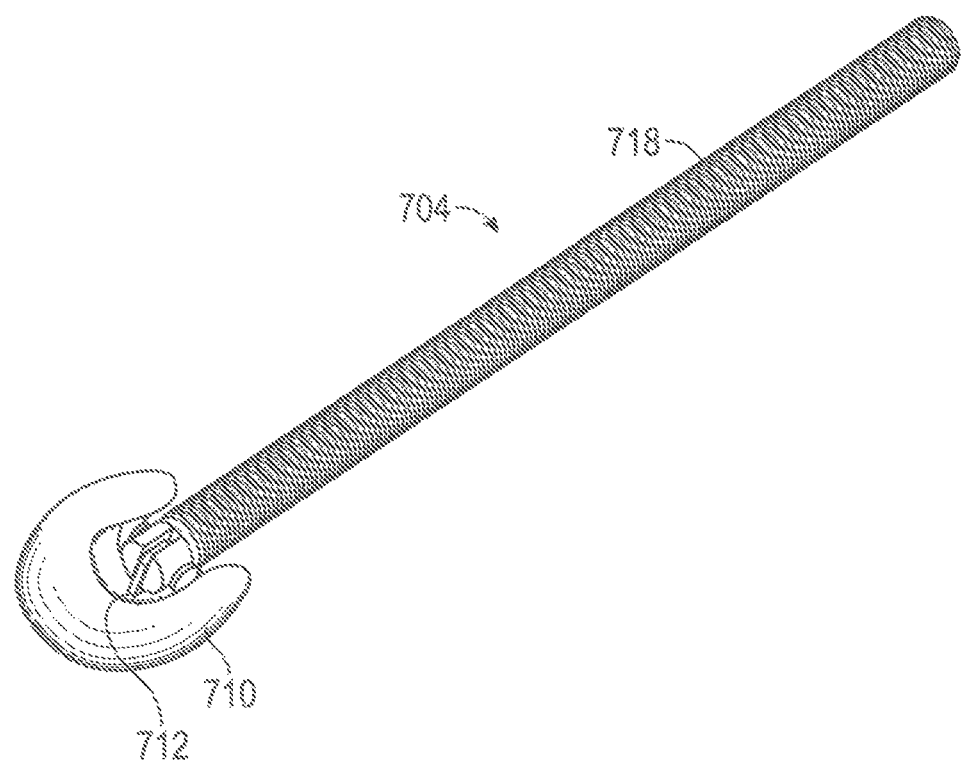

Next, the toggle anchor assembly 704 may be manipulated so that an overall profile of the flexible cap 710, and the spring washer assembly 712 armored thereby, is small enough to fit into the hole 717. In embodiments, the toggle anchor assembly 704 may comprise an elongated threaded fastener 718 that is pivotably attached to the spring washer assembly 712, and the spring washer assembly 712 may be movable from a relaxed state (see, e.g., FIG. 19) to a compressed state (see, e.g., FIG. 20) upon exerting sufficient force on the sides of the spring washer assembly 712, as described in more detail herein. In such cases, an overall width of the toggle anchor assembly 704 may be reduced by rotating the spring washer assembly 712 to one side of the threaded fastener 718, so that the flexible cap 710 is substantially parallel to the threaded fastener 718, as shown in FIG. 19. In addition, an overall depth of the toggle anchor assembly 704 may be reduced by compressing, pinching or bending the sides of the spring washer assembly 712 together, or towards each other, so that the spring washer assembly 712 is curved around the threaded fastener 718 (e.g., so as to form a taco, C-shape, or the like), as shown in FIG. 20.

Figure 22:
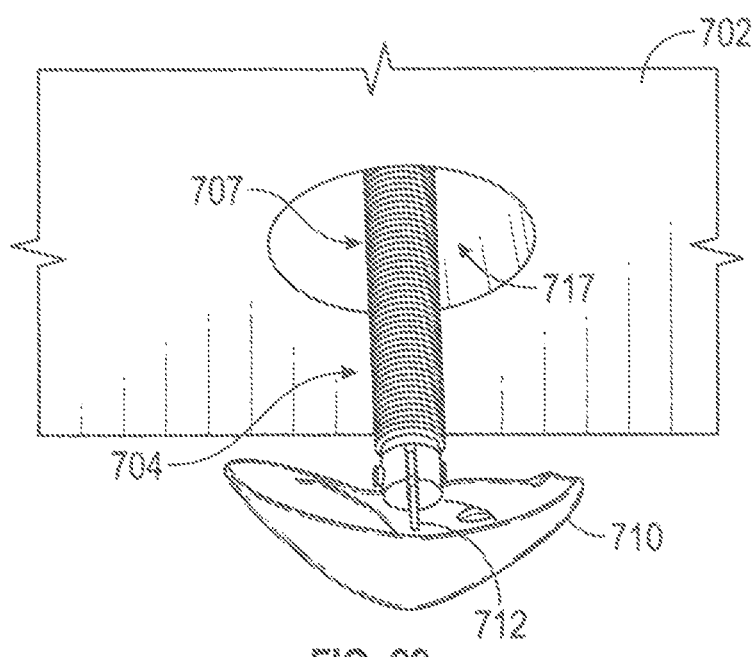

Once the spring washer assembly 712 is primed for insertion, the toggle anchor assembly 704 may be inserted into the hole 717 from the front side 713 of the wall panel 702. As shown in FIG. 21, the manipulated spring washer assembly 712 may be inserted first. In some embodiments, a smooth-surfaced tool, such as, e.g., a shoe horn-type device, may be used to ease the spring washer assembly 712 into the hole 717. Once the spring washer assembly 712 is fully inside the hole 717, e.g., as shown in FIG. 21, the threaded fastener 718 may be used to continue pushing the toggle anchor assembly 704 through the hole 717 until the flexible cap 710 and spring washer assembly 712 extend or pop out from the other side 711 of the wall panel 702, as shown in FIG. 22.

Once the spring washer assembly 712 is freed from or extends past the hole 717, the spring washer assembly 712 may naturally move or spring back to its relaxed state or width (see, e.g., FIG. 19), as the compressive force exerted by the inner walls of the hole 717 are no longer present. The spring washer assembly 712 may also be pivoted back to its original, neutral position (see, e.g., FIG. 27) by pulling or tugging the end portion 709 of the threaded fastener 718 away from the back side 711 of the wall panel 702 or towards the front side 713. In embodiments, this pulling motion does not cause the toggle anchor assembly 704 to slip back through the hole 717 because the relaxed width of the spring washer assembly 712 is larger than the diameter of the hole 717. Moreover, the force exerted by this pulling motion can cause the flexible cap 710 to press against the back side 711 of the wall panel 702, adjacent to the hole 717, and this contact with, or pressure against, the back side 711 can provide enough leverage to rotate, swing, or otherwise maneuver the spring washer assembly 712 up and away from the threaded fastener 718 and back into its neutral position. A continued pulling motion may cause the flexible cap 710 and the spring washer assembly 712 included thereunder to deploy, by spreading out into a flexed or expanded position that substantially covers the hole 717. Pulling the threaded fastener 718 further may cause the flexible cap to draw tight against the back side 711 of the wall panel 702 and seal the hole 717, as shown in FIGS. 23 and 24.

Figure 23:
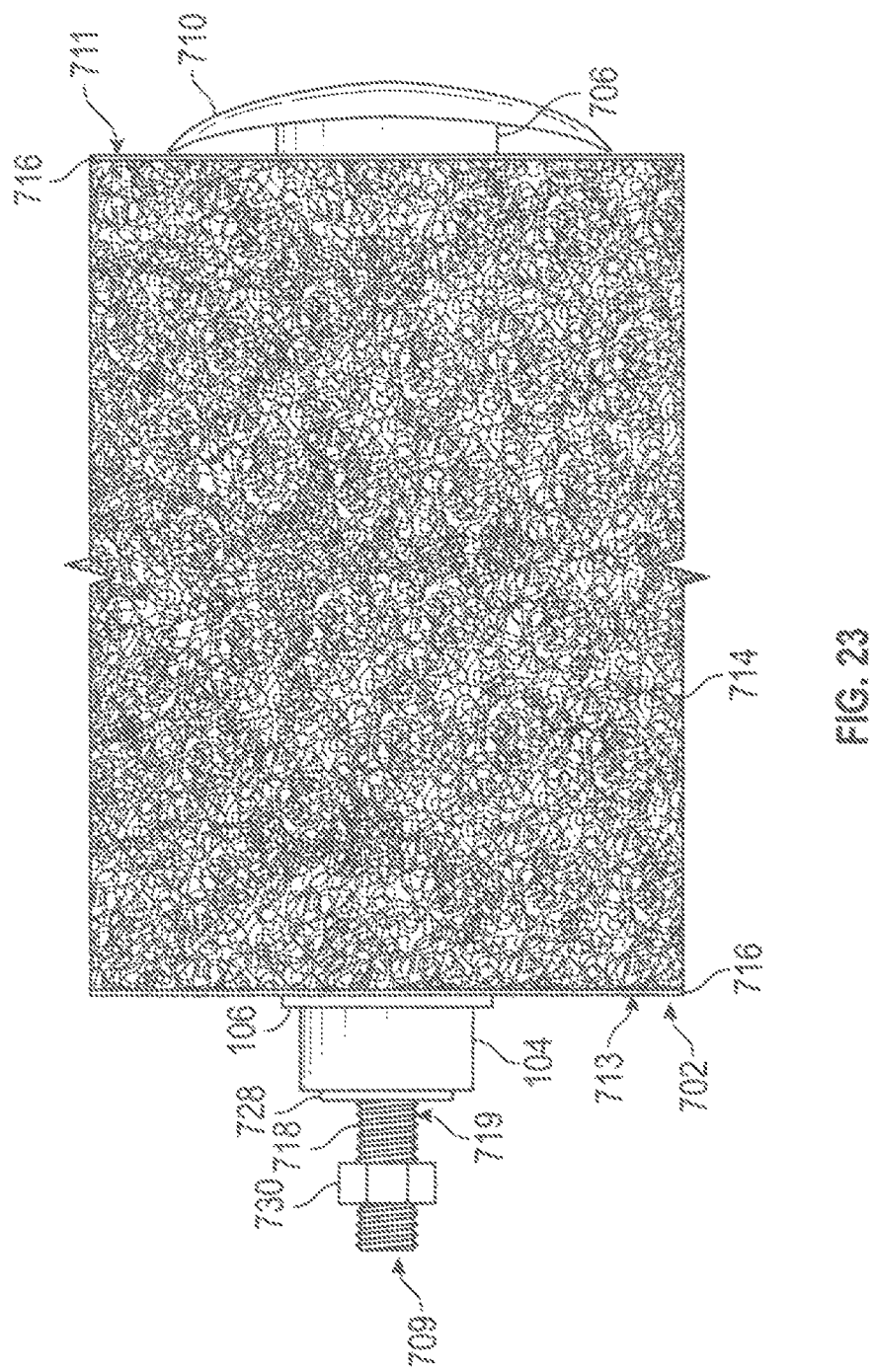
Figure 24:
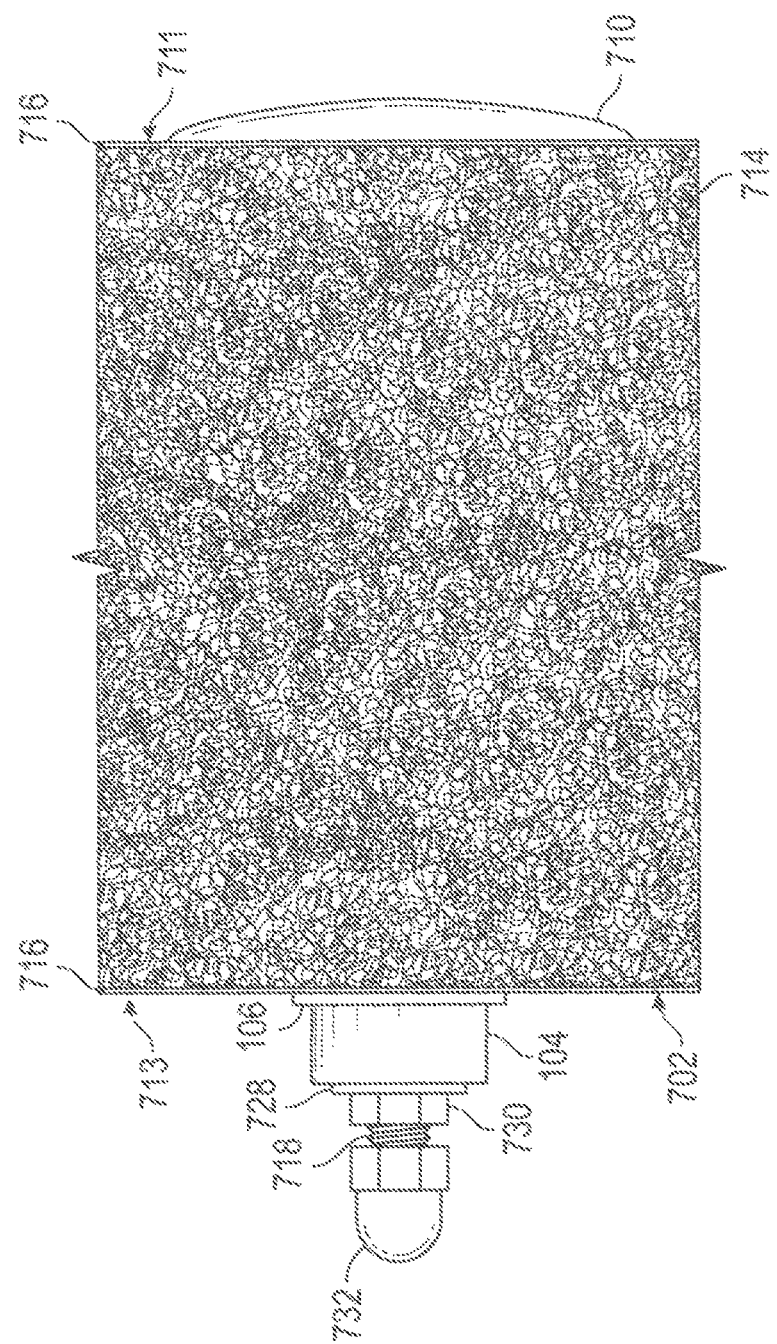

As also shown in FIG. 23, a portion 719 of the threaded fastener 718 may continue to protrude or extend from the hole 717 after insertion of the toggle anchor assembly 704 into the hole 717 and attachment of the flexible cap 710 to the back side 711 of the wall panel 702. The exposed portion 719 of the fastener 718 is likely to collect debris and other contaminants due to its threaded outer surface. Accordingly, in embodiments, the exposed portion 719 is at least substantially covered by one or more components of the fastener assembly 700, such as, e.g., the washer assembly 106, the spacer 104, and the end assembly 708, as shown in FIGS. 18, 23 and 24. These components also ensure that the toggle anchor assembly 704 is tightly secured against the wall panel 702, as described in more detail herein.

In embodiments, prior to covering the exposed portion 719, the sheath 706 may be inserted into the hole 717 to completely surround the middle extent 707 of the toggle anchor assembly 704, or threaded fastener 718. The sheath 706 may be an elongated, annular tube, or other structure with open ends and a hollow center, that is configured to slide in around the toggle anchor assembly 704 and substantially fill any empty space within the hole 717. For example, a length of the sheath 706 may be selected to match a width of the wall panel 702 (e.g., four to eight inches), so that the sheath 706 extends from the front surface 713 to the back surface 711, as shown in FIG. 1. In addition, a thickness of the sheath 706 may be selected so that the space between the middle extent 707 of the threaded fastener 718 and the interior walls of the hole 717 is substantially filled or occupied by the sheath 706. Further, the sheath 706 may have an inner annular diameter selected to be larger than a thickness of the threaded fastener 718 so the sheath 706 can easily fit over or slid in around the toggle anchor assembly 704.

Figure 25:
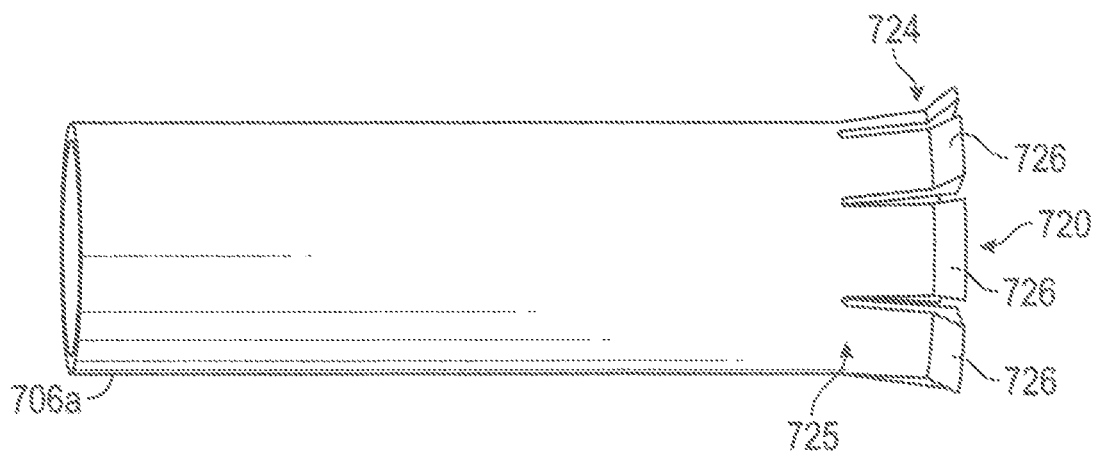
FIGS. 25 and 26 are side views of exemplary sheath components included in the fastener assembly shown in FIG. 18, in accordance with certain embodiments.
Figure 26:
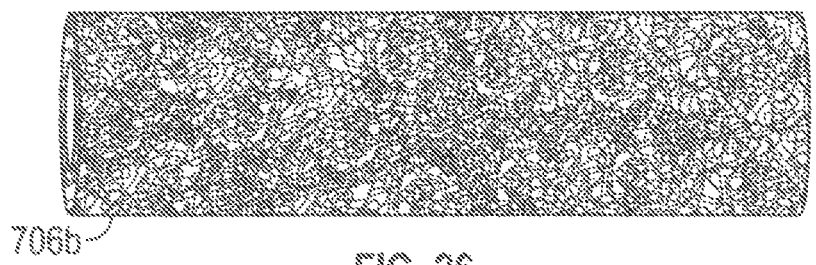

In the illustrated embodiment, the sheath 706 comprises two parts, an outer sleeve 706a, shown in FIG. 25, and an inner filling 706b, shown in FIG. 26. In such cases, the outer sleeve 706a may inserted into the hole 717 through the wall panel 702 first, and then the inner filling 706 may be inserted into the space between the outer sleeve 706a and the toggle anchor assembly 704. In other embodiments, the sheath 706 may be a one-piece structure for sealing the space around the toggle anchor assembly 704 within the hole 717 through the wall panel 702. For example, the outer sleeve 706a may be permanently attached to the inner filling 706b. In still other embodiments, the inner filling 706b may not be provided as a single pre-assembled, solid form, but rather, may be installed in pieces, or may be a substance that becomes solid after application to its intended surface (such as, e.g., spray foam or the like). Other configurations for the sheath 706 are also contemplated.

As will be appreciated, creating the hole 717 through the entire width of the wall panel 702 may affect the overall integrity of the wall panel 702. Accordingly, the outer sleeve 706a may be configured to operate as a buttress or interior support for the inner walls of the hole 717. For example, the outer sleeve 706a may have a rigid structure, made of hard plastic or other suitable material, and may be tubular or cylindrical in shape, so that the walls of the outer sleeve 706a are substantially flush with or press against the inner walls of the hole 717. Forming the hole 717 through the wall panel 702 can also create an opening for debris and other contaminants to enter the otherwise highly clean environment. Accordingly, the outer sleeve 706a may serve as a barrier between the hole 717 and the inner portion 714 of the wall panel 702 that is adjacent to the hole 717. In addition, the inner filling 706b may be configured to operate as a stopper or plug for securely sealing the hole 717 from containments that may otherwise enter from outside the wall panel 702. For example, the inner filling 706b may be made of a flexible and/or compressible material, such as, e.g., a foam insulation or the like, that can conform to, or be molded around, the threaded outer surface of the middle extent 707 of the toggle anchor assembly 704, so as to fill both large and small gaps between the outer sleeve 706a and the toggle anchor assembly 704.

In embodiments, the sheath 706 may also be configured to engage the washer assembly 106 to provide good shear strength to the fastener assembly 700 or otherwise help support shear loads, similar to the engagement between the washer assembly 106 and the anchor 108 shown in FIG. 3. For example, the sheath 706 and the washer assembly 106 may be configured to pinch the thin panel 716 from both sides of the front side 713 in order to counter shear stresses, as needed. To create this engagement, an extent or length of the sheath 706 may be compressed against the underside of the front side 713, such that the overall body length is reduced. The illustrated embodiment (e.g., as shown in FIGS. 18 and 25) uses a ferruled end or crown to create this compressive contact with the underside of front side 713. Other techniques or configurations are also contemplated, such as, for example, placing a gasket or other compressible material or device at a top end 720 of the sheath 706.

Referring now to FIG. 25, the top end 720 of the outer sleeve 706a may include an annular collar or crown 724, similar to the upper crown 124 of the fastener assembly 100 shown in FIG. 1. For example, like the upper crown 124, the crown 724 may include a plurality of circumferentially spaced elements 726 (e.g., fingers) that cooperate to form an outer crown diameter, $d_o$, and give the crown 724 a generally castled shape. In addition, the crown elements 726 extend upwards and outwards from a base portion 725 of the crown 724, so as to create an outwardly sloping wall around at least a portion of the crown 724, like the crown elements 126 shown in FIG. 1. In some embodiments, for example, as shown in FIG. 18, each crown element 726 may end at a substantially flat top rim 727 that is formed by a flange or protruding lip portion extending radially outward from the rest of the element 726, similar to the top rim 130 shown in FIG. 2.

Also like the crown 124 of the fastener assembly 100, the crown elements 726 of the crown 724 may be configured to move when a force is exerted on the crown 724, for example, as described herein with respect to FIGS. 4 through 6. Such forces may include, for example, compressive forces applied to the crown 724 as the sheath 706 is inserted into the hole in the wall panel 702 through the front side 713. For example, the hole 717 may have a diameter $d_1$ that is smaller than the outer crown diameter $d_o$ of the upper crown 724. In such cases, the crown elements 726 may be at least slightly pushed inwards to a contracted position having a reduced outer crown diameter, for example, as shown in FIG. 6. Once inside the hole 717, the crown elements 726 may at least partially expand or spring back and the top rim 727 may press against an underside of the front side 713 of the wall panel 702, for example, as shown in FIG. 4 and described herein.

In some cases, the crown elements 726 may expand to a larger outer crown diameter when the washer assembly 106 is inserted into the hole 717 through the front side 713 until it engages the upper crown 724, for example, as shown in FIG. 18. In particular, the washer assembly 106 may have the beveled projection 136 described herein and shown in FIG. 7, for example. The projection 136 may have a diameter that is larger than the outer crown diameter $d_o$ and may press or force the crown elements 726 outwards as the washer assembly 106 is coupled to the hole formed through the wall panel 702. The force exerted by the washer projection 136 onto the upper crown 724 may cause the crown elements 726 to move to an expanded position having an enlarged outer crown diameter, for example, as shown in FIG. 5. This expanded position may cause the overall body length of the sheath 706 to be reduced or compressed, as an extent of the crown elements 726 are now bent to the side. In embodiments, to ensure this engagement, the outer crown diameter $d_o$ of the upper crown 724 may be selected based on a diameter of the washer projection 136, or vice versa, as described herein with respect to the washer assembly 106. In some embodiments, a diameter of the hole formed through the wall panel 702 may be selected based on the diameter of the washer projection 136 and/or the outer crown diameter $d_o$, as also described herein. For the sake of brevity, further details about the crown 724 and its engagement with the washer assembly 106 are not provided here as they are substantially similar to the above description of the anchor crown 124 and its engagement with the washer assembly 106, particularly with respect to FIGS. 4 through 6.

In some alternative embodiments, the toggle anchor assembly 704 may not include the sheath 706 at all. In such cases, the washer assembly 106 may be coupled the hole 717 directly, for example, by inserting the projection 136 into the hole 717. In still other embodiments, the sheath 706 may have plain or solid sidewalls without the compressible top end 720. In such cases, the washer assembly 106 may be configured to engage both sides of the front side 713 of the wall panel 702 or otherwise support shear stresses at the hole 717 using other techniques (e.g., adhesive, etc.).

As shown in FIG. 23, once the washer assembly 106 is secured to the wall panel 702 adjacent to the front side 713 and to the sheath 706 within the wall panel 702, the spacer 104 may be slid over, or coupled to, the exposed portion 719 of the threaded fastener 718 protruding from the front side 713 of the wall panel 702. The spacer 104 may have a smooth interior surface, such that the spacer 104 simply slides over the threaded surfaces of the fastener 718. In embodiments, the spacer 104 may have a specific length selected to cover at least part of the exposed portion 719 of the threaded fastener 718, and a smooth, rounded outer surface to avoid collection of any debris or contaminants thereon. As an example, the spacer 104 may be made of metal (e.g., stainless steel), hard plastic, or any other appropriate material. The spacer 104 may also be coupled to the washer assembly 106. For the sake of brevity, further details about the engagement of the spacer 104 with the washer assembly 106 and the engagement of the washer assembly 106 with the wall panel 702 are not provided here as they are substantially similar to the above description of the spacer 104 and the washer assembly 106, particularly with respect to FIGS. 7 through 10.

As shown in FIGS. 23 and 24, once the spacer 104 is coupled to the threaded fastener 718 of the toggle anchor assembly 704, the end assembly 708 may be secured to the end portion 709 of the threaded fastener 718 in order to tighten the toggle anchor assembly 704 against the back side 711 of the wall panel 702. Fully tightening the toggle anchor assembly 704 may cause the flexible cap 710, and the spring washer assembly 712 encapsulated thereby, to expand and flatten against the back side 711 of the wall panel 702, for example, as shown in FIG. 2, thereby creating a more secure seal over the hole 717 at the backside 711. In addition, the end assembly 708 may be configured to form a secure attachment to the end portion 709 of the threaded fastener 718, for example, such that the end assembly 708, or components thereof, do not come loose (e.g., due to vibrations) and fall into the highly clean environment below it.

In the illustrated embodiment, the end assembly 708 includes a thin, flat washer 728 coupled to the threaded fastener 718 adjacent to the spacer 104, a first nut 730 coupled to the threaded fastener 718 adjacent to the thin washer 728, and a second nut 732 coupled to the end portion 709 of the threaded fastener 718, adjacent to the first nut 730. In embodiments, the flat washer 728 has no threads and may be configured to evenly distribute the loads of the threaded fastener 718, the first nut 730, and the second nut 732 as the toggle anchor assembly 704 is tightened. The first nut 730 may be a type of hex nut (e.g., hex finish nut hex jam nut, etc.) or other nut with internal threads configured for fastening to the threaded fastener 718 of the toggle anchor assembly 704. The second nut 732 may be an acorn nut, or cap nut, with a smooth, rounded head, or dome top, to provide a cleaner, more sanitary cover for the end portion 709 of the toggle anchor assembly 704. For example, the dome top of the second nut 732 has minimal horizontal surfaces on which debris or contaminants can collect. In addition, the second nut 732 serves to prevent contact with the threaded surfaces of the end portion 709 of the fastener 718, thus further preventing debris and other contaminants from collecting on the components of the toggle anchor assembly 704.

In some embodiments, the first nut 730 may be a hex jam nut for locking the first nut 720 into place along the exposed portion 719 of the threaded fastener 718. For example, the first nut 730 may be coupled to the threaded fastener 718 first, as shown in FIG. 23, until the first nut 730 is adjacent to the flat washer 728 resting on the spacer 104. In some cases, the first nut 730 may be tightened until the flexible cap 710 is sufficiently expanded around the hole 717 on the back side 711 of the wall panel 702 to cover and seal the opening against debris, contaminants, and other environmental elements. Next, the second nut 732 may be coupled to the end portion 709 of the threaded fastener 718, as shown in FIG. 24, and tightened until the second nut 732 is adjacent to, or abuts, the first nut 730. Finally, the second nut 732 may be tightened against, or screwed down on top of, the first nut 730 to create a secure friction fit between the two nuts 730 and 732.

Other configurations for the end assembly 708 and for the coupling of the end assembly 708 to the end portion 709 of the threaded fastener 718 are also contemplated. For example, in one embodiment, the first nut 730 and the second nut 732 may be joined together to form one fastener unit configured for secure coupling to the threaded fastener 718 adjacent to the spacer 104. In another embodiment, the end assembly 708 may include only one nut, such as, e.g., the acorn nut 732, for securely tightening the toggle anchor assembly 704 against the wall panel 702.

Referring now to FIGS. 27 through 30, shown is an exemplary toggle anchor assembly 804 that is similar to the toggle anchor assembly 704 shown in FIGS. 18 through 24, in accordance with embodiments. For example, the toggle anchor assembly 804 includes a spring washer assembly 812 covered by a flexible cap 810 and coupled to an elongated threaded fastener 818, each of which is similar to the corresponding components of the toggle anchor assembly 704. The threaded fastener 818 may include an all-thread rod portion 820 or other elongated fastener substantially covered in threaded surfaces and a coupler portion 822 for attaching the all-thread rod 820 to the spring washer assembly 812. The all-thread rod 820 may have a length that is selected based on the width of the wall panel 702 and so that an end portion 809 of the rod 820 extends past the wall panel 702 for coupling to the washer assembly 106, spacer 104, and end assembly 708.

Figure 28A:
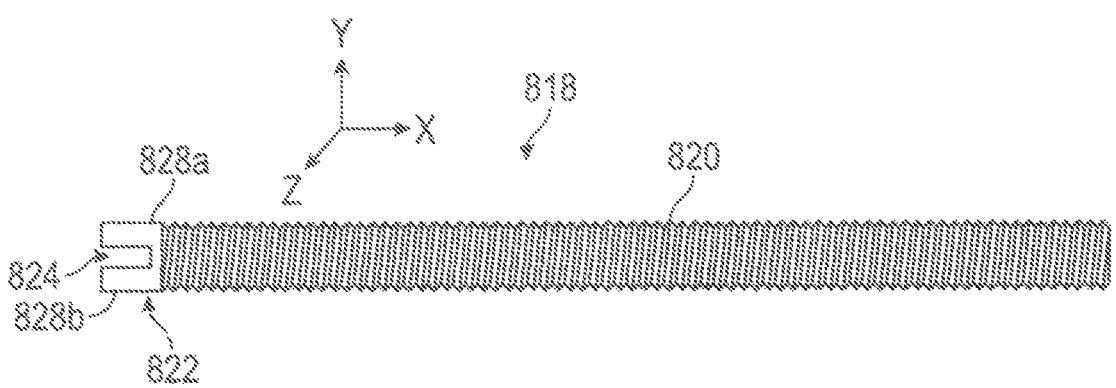
FIGS. 28A and 28B are first and second side views of an exemplary fastener included in the toggle anchor assembly of FIG. 27, in accordance with certain embodiments.
Figure 30:
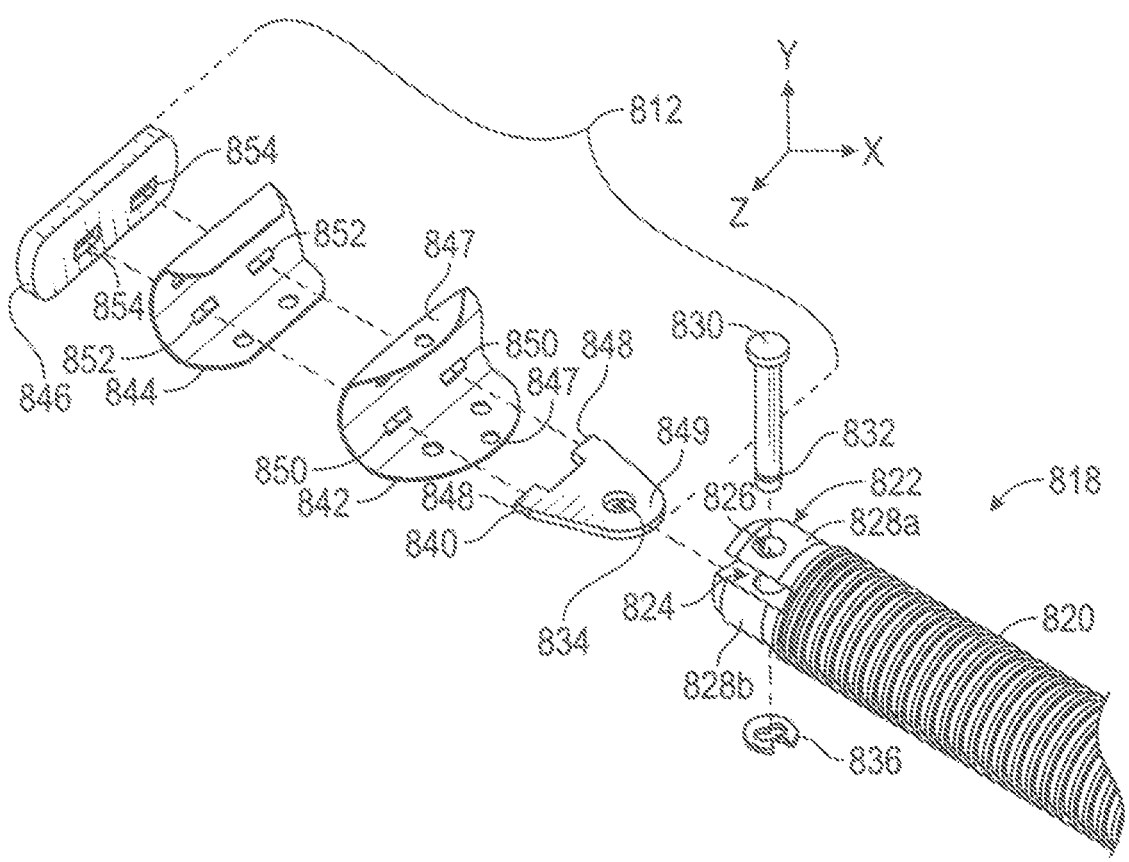
FIG. 30 is an exploded perspective view of a top portion of the toggle anchor assembly shown in FIG. 27, in accordance with certain embodiments.

In the illustrated embodiment, the coupler portion 822 includes a slot 824 along a first axis and an aperture 826 along a second axis perpendicular to the first axis. FIG. 28A depicts a first side view of the threaded fastener 818 to better illustrate the slot 824. As shown therein, the slot 824 passes or slices through a center of the coupler portion 822 between first and second walls 828a and 828b of the coupler portion 822. The slot 824 ends adjacent to, or perpendicular to, a starting point of the all-thread portion 820, as shown in FIGS. 28A and 30. In embodiments, the slot 824 is configured to receive a portion of the spring washer assembly 812. Accordingly, a height and depth of the slot 824 may be selected based on said portion of the spring washer assembly 812, as is described in more detail herein.

Figure 27:
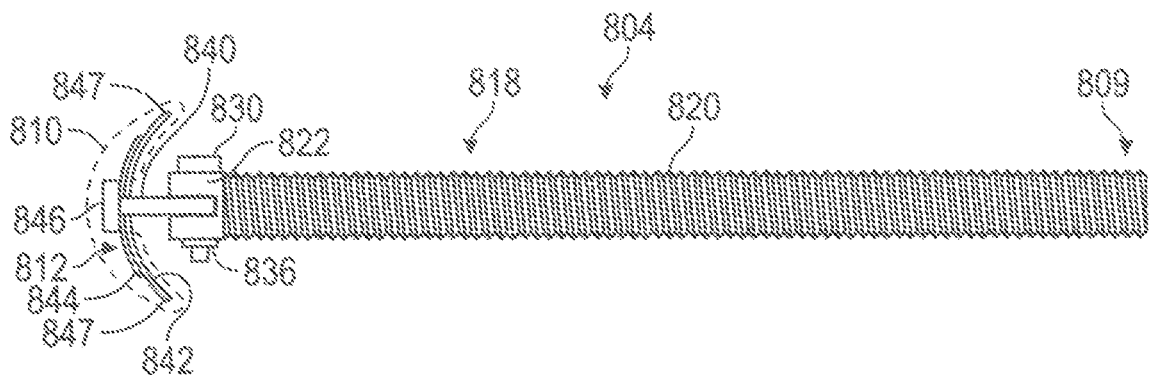
FIG. 27 is a side view of an exemplary toggle anchor assembly included in the fastener assembly of FIG. 18, in accordance with certain embodiments.
Figure 28B:
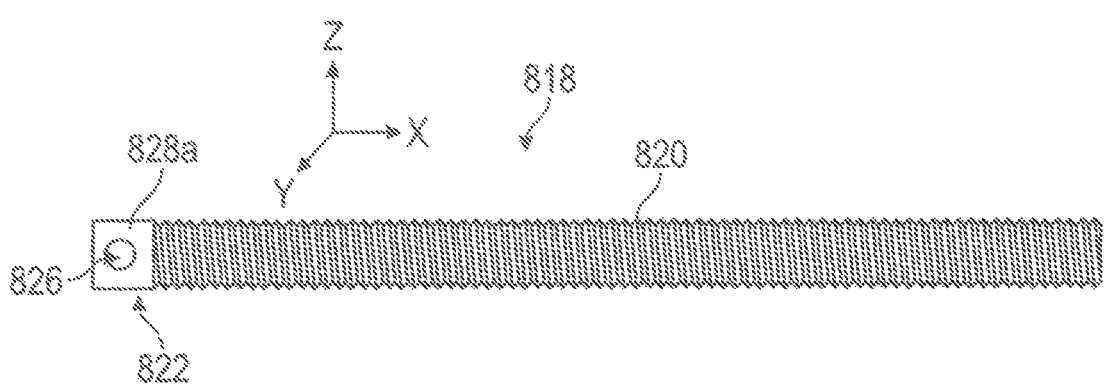

FIG. 28B depicts a second side view of the threaded fastener 818 that is rotated 90 degrees from the first side view of FIG. 28A to better illustrate the aperture 826. The aperture 826 passes through a center of the first wall 828a, shown in FIG. 28B, and also a center of the second wall 828b, shown in FIG. 30. The aperture 826 may be sized and shaped to receive a pivot pin 830 that has a substantially plain head and substantially plain side surfaces, except for a groove 832 near a bottom end of the pin 830, as shown in FIGS. 27 and 30. The pivot pin 830 may be coupled to the coupler portion 822 after the spring washer assembly 812 is coupled to the slot 824 and a second aperture 834 included on the spring washer assembly 812 is aligned with the first aperture 826, so that the pivot pin 830 can be inserted into both apertures 826 and 834. This coupling is more clearly shown in the cross-sectional view of FIG. 18, specifically by the coupling of pivot pin 730 to threaded fastener 718 and yoke portion 740 of the spring washer assembly 712.

Once the pivot pin 830 is coupled to the coupler portion 822 and the spring washer assembly 812, a lock washer 836 may be coupled to the groove 832 to keep or hold the pivot pin 830 in place, as shown in FIG. 27, thereby securing the spring washer assembly 812 to the coupler portion 822. The lock washer 836 may be configured to prevent the pivot pin 830 from turning, slipping, or coming loose due to vibrations, torque, or rotation. As shown in FIG. 30, the lock washer 836 may be a split lock washer (also known as a "spring lock washer") with two open ends that are bent into a slightly helical shape. When the split lock washer 836 is secured to the groove 832, the open ends of the lock washer 836 may exert a spring or tension force against the groove 832, thus creating friction and providing resistance to rotation. In embodiments, the pivot pin 830 may have a length that is selected based on the height of the aperture 826 and a size of the lock washer 836, so that the pivot pin 830 can extend past the aperture 826 and still receive the lock washer 836 at its bottom end. For example, this configuration is shown in FIG. 18 by the pivot pin 730 extending past the top and bottom sides of the threaded fastener 718 and coupling to lock washer 736 on the bottom side.

In FIG. 27, the flexible cap 810 is drawn in phantom lines in order to allow visibility of the spring washer assembly 812 included therein. According to embodiments, the flexible cap 810, which may be similar to or same as the flexible cap 710 shown in FIGS. 18-24, may be made of a pliable material, such as, for example, rubber (e.g., EPDM, etc.), silicone, flexible plastic, or other elastomer to enable the manipulation required to insert the toggle anchor assembly 704/804 into the hole 717 of the wall panel 702 (see, e.g., FIGS. 20 and 21). The pliable material may be applied to, coated onto, or molded to the spring washer assembly 812 to create or form the flexible cap 810 (see, e.g., FIGS. 19 and 20) using appropriate techniques.

Figure 29A:
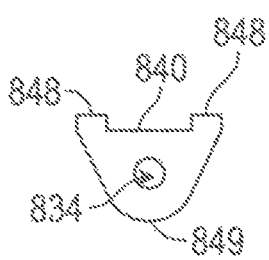
FIGS. 29A through 29D are top views of exemplary spring washer components included in the toggle anchor assembly of FIG. 27, in accordance with certain embodiments.
Figure 29B:
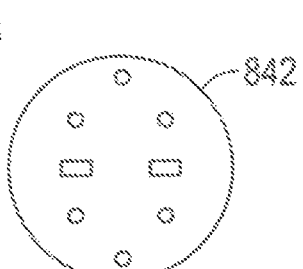
Figure 29C:
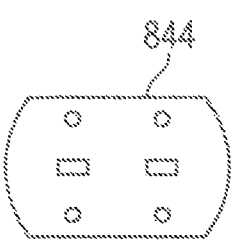
Figure 29D:

As shown in FIG. 30, the spring washer assembly 812 may also be made of at least somewhat flexible parts to enable the manipulation required to insert the toggle anchor assembly 804 into the hole 717. In the illustrated embodiment, the spring washer assembly 812 includes a yoke portion 840 (e.g., as shown in FIG. 29A), a first leaf spring component 842 (e.g., as shown in FIG. 29B), a second leaf spring component 844 (e.g., as shown in FIG. 29C), and a draw bar 846 (e.g., as shown in FIG. 29D). As shown in FIG. 27, the components 840, 842, 844, and 846 may be stacked on top of each other and may have varying sizes so that the resulting structure has a generally curved shape that is thinner at its free ends 847 and thicker in the center at the point of coupling, similar to a traditional leaf spring. In the illustrated embodiment, the first leaf spring component 842 is the largest component and forms the thinnest portion of the spring washer assembly 812, or free ends 847 shown in FIGS. 27 and 30. The second leaf spring component 844 is smaller than the first leaf component 842 in at least one dimension, as shown in FIGS. 29B and 29C, and overlaps with a central portion of the first leaf component 842 to provide support or reinforcement to the same as the free ends 847 are bent together. The draw bar 846 may be smaller and thicker than both, as shown in FIGS. 27, 29, and 30, and may overlap central portions of both leaf components 844 and 842, as shown in FIG. 27, to provide further support or reinforcement to the same as the free ends 847 are folded together. In embodiments, this flexible, stacked configuration may prevent breakage or snapping of the spring washer assembly 812 as the assembly 812 is bent or moved from a relaxed state (e.g., as shown in FIGS. 27 and/or 29) to a compressed state (e.g., as shown in FIGS. 30 and/or 20) and inserted into the hole 717 of the wall panel 702.

As shown in FIG. 30, the components of the spring washer assembly 812 may be assembled together by first coupling the yoke portion 840 to the slot 824 in the coupler portion 822 of the threaded fastener 818. As shown, the yoke portion 840 comprises the second aperture 834 for pivotably coupling the spring washer assembly 812 to the threaded fastener 818 using the pivot pin 830. As also shown, the yoke portion 840 has a generally "U" or "V" shape formed by a generally rounded base 849 that includes the second aperture 834 and two ends or extensions 848 that protrude upwards and away from the base 849. The rounded base 849 may be configured to allow the spring washer assembly 812 to pivot or rotate about the pivot pin 830, for example, so that the spring washer assembly 812 can be folded against the side of the fastener 818, as shown in FIG. 19. In the illustrated embodiment, the rounded base 849 is sized and shaped so that the yoke portion 840 can rotate, or swing freely, within the slot 824 from one side of the coupler portion 822 to the other side, or 180 degrees. Thus, the spring washer assembly 812 may be folded to one side of the fastener 818 by rotating the yoke 840 until it is turned 90 degrees relative to a central axis (e.g., as shown in FIG. 19). To straighten the spring washer assembly 812 back to its expanded state (e.g., after passing through the hole 717 to the back side 711), the yoke 840 may be rotated 90 degrees in the opposite direction, until the central axis of the spring washer assembly 812 is aligned with a central axis of the coupler portion 822, as shown in FIG. 27.

The two extensions 848 of the yoke portion 840 may be configured for coupling to the other components of the spring washer assembly 812. More specifically, the yoke 840 may be coupled to the first leaf spring component 842 by inserting the extensions 848 through corresponding apertures 850 of the first leaf spring component 842. Likewise, the yoke 840 may also be coupled to the second leaf spring component 844 by further inserting the extensions 848 through corresponding apertures 852 of the second leaf spring component 844. In addition, the yoke 840 may be coupled to the draw bar 846 by also inserting the extensions 848 through corresponding apertures 854 of the draw bar 846. This coupling between the components of the spring washer assembly 812 is shown in the cross-sectional view of FIG. 18 by yoke 740 extending through first leaf spring 742 and second leaf spring 744 and ending at draw bar 746. In embodiments, the extensions 848 and/or the apertures 850, 852, and 854 may be sized and shaped to enable said engagement between the yoke portion 840 and the remaining components 842, 844, and 846. For example, each of the extensions 848 may have a height that is larger enough to receive the leaf springs 842 and 844 and also connect to the draw bar 846. In some embodiments, the draw bar 843 may be configured to clamp onto the extensions 848 of the yoke portion 840 or otherwise secure the yoke extensions 848 to the draw bar apertures 854 using a friction fit, press fit, or the like.

Figure 31:
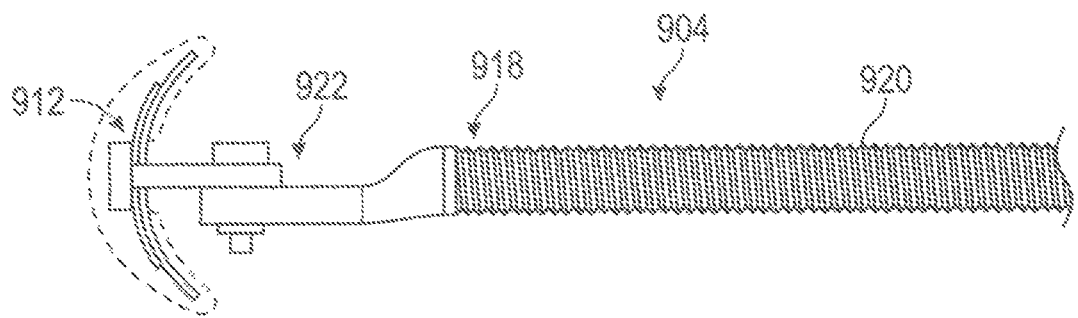
FIG. 31 is a side view of another exemplary toggle anchor assembly, in accordance with certain embodiments.
Figure 32:
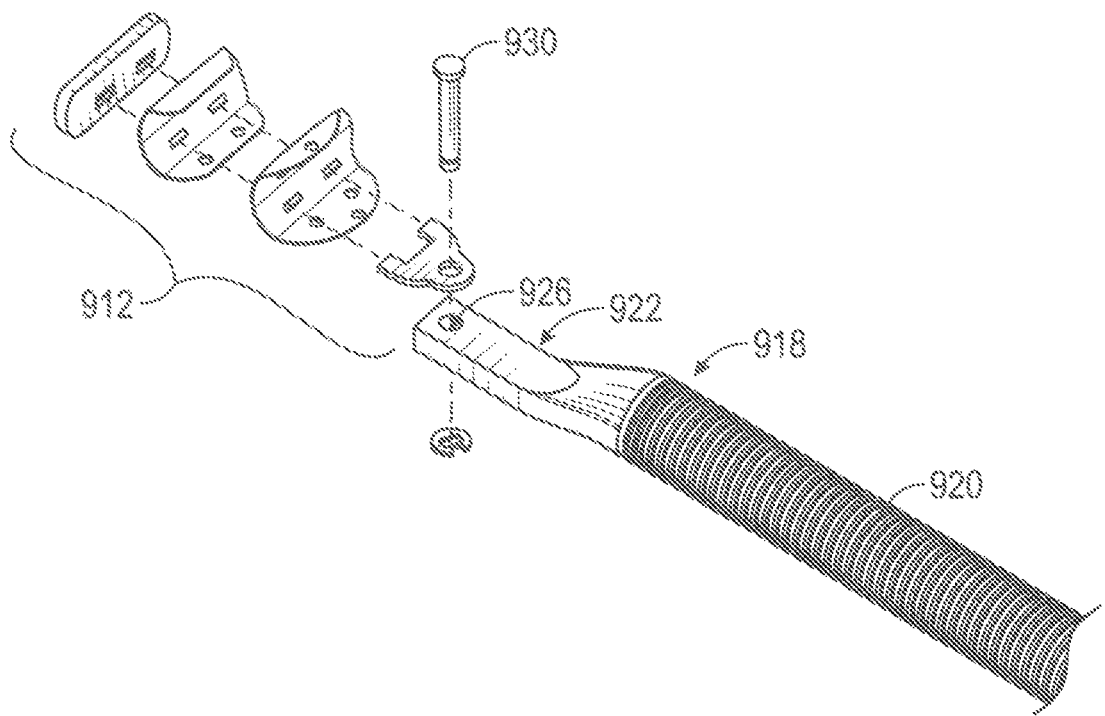
FIG. 32 is an exploded perspective view of a top portion of the toggle anchor assembly shown in FIG. 31, in accordance with certain embodiments.

Other configurations for the toggle anchor assembly 704/804 are also contemplated. For example, FIGS. 31 and 32 illustrate another exemplary toggle anchor assembly 904 in which a threaded fastener 918 comprises a coupler portion 922 that does not have a slotted portion for receiving a spring washer assembly 912. Instead, the coupler portion 922 only has an aperture 926 for coupling the spring washer assembly 912 to the threaded fastener 918 via a pivot pin 930. The spring washer assembly 912 may still be pivoted or rotated about the pin 930 in order to swing the spring washer assembly 912 to one side during insertion of the toggle anchor assembly 904 into a wall panel hole.

In other embodiments, the spring washer assembly 704 may be a unitary piece with moveable free ends that can be folded into a smaller size during insertion through the wall panel hole and can automatically spring open once the hole is cleared, similar to, for example, a toggle bolt or other spring-loaded fastener. In such cases, the spring-loaded, moveable free ends may still be covered by or coated with a flexible material that can be pulled tight against the back side of the wall panel to form a tight seal over the wall panel hole, like the flexible cap 710.

In embodiments, a strut assembly for carrying a support element may be coupled to the toggle anchor assembly 704. For example, the strut assembly (not shown) may be coupled to the end portion 709 of the threaded fastener 718 and placed adjacent to the spacer 104 before coupling the end assembly 708 to the end portion 709. Other configurations for coupling a supported element to the fastener assembly 700 are also contemplated.

Figure 33:
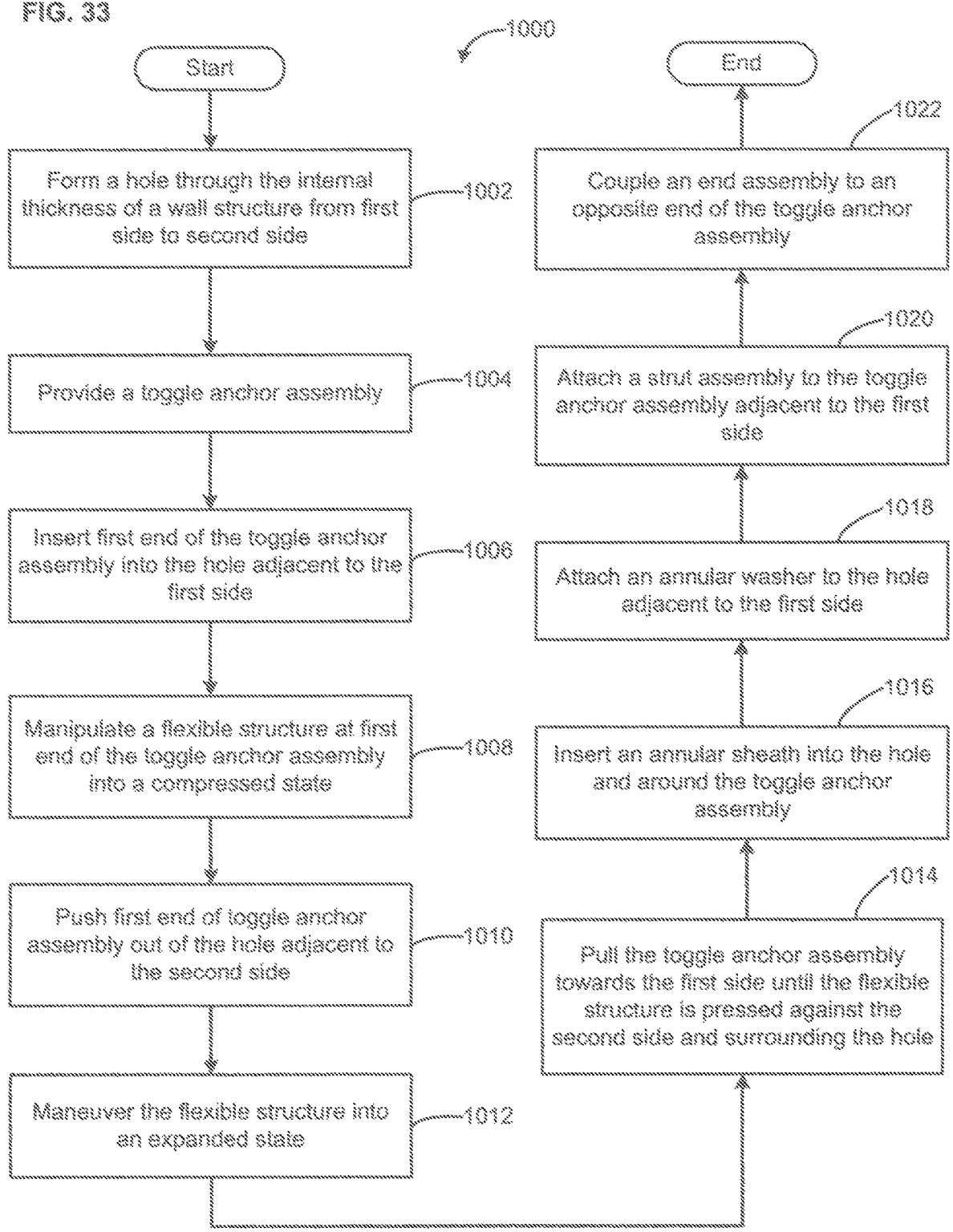
FIG. 33 is flow diagram for another exemplary method of mounting a supported element to a wall structure, in accordance with certain embodiments.

FIG. 33 illustrates an exemplary method 1000 of mounting a supported element to a wall structure having an internal thickness comprised of compressible material residing between opposing first and second sides of the wall structure, in accordance with embodiments. As an example, the method 1000 may be used to mount a strut assembly coupled to a pipe, conduit, or tube (e.g., strut assembly 304 shown in FIG. 3) to a laminate foam wall panel (e.g., wall panel 702 shown in FIG. 18) using a fastener assembly (e.g., fastener assembly 700 shown in FIG. 18). The method 1000 may begin at step 1002 with forming a hole (e.g., hole 717 shown in FIG. 21) through the internal thickness (e.g., inner portion 714 shown in FIG. 18) of the wall structure extending from the first side (e.g., front side 713 shown in FIG. 18) to the second side (e.g., back side 711 shown in FIG. 18). The hole may have a characteristic diameter that determines or is determined by the dimensions of other components of the fastener assembly 700.

Step 1004 includes providing a toggle anchor assembly (e.g., toggle anchor assembly 704 shown in FIG. 18) having a first end configured to pass through the hole and engage the second side of the wall structure while an opposite end (e.g., end portion 709 shown in FIG. 18) of the toggle anchor assembly remains outside of the hole adjacent to the first side. Step 1006 includes manipulating a flexible structure (e.g., spring washer assembly 712 encapsulated by flexible cap 710, as shown in FIG. 18) included in the first end of the toggle anchor assembly into a compressed state. In some embodiments, the toggle anchor assembly includes a threaded fastener (e.g., threaded fastener 718 shown in FIG. 18) pivotably coupled to the flexible structure. In such cases, manipulating the flexible structure into a compressed state may include rotating the flexible structure to a side of the threaded fastener and/or compressing the flexible structure until a diameter of the flexible structure is less than a diameter of the hole.

At step 1008, the first end of the toggle anchor assembly is inserted into the hole adjacent to the first side while maintaining the flexible structure in the compressed state (e.g., as shown in FIGS. 20 and 21). At step 1010, the first end of the toggle anchor assembly is pushed out of the hole adjacent to the second side (e.g., as shown in FIG. 22). At step 1012, the flexible structure is maneuvered into the expanded state (e.g., as shown in FIG. 23). In some embodiments, maneuvering the toggle anchor assembly may include causing the flexible structure to deploy into the expanded position by swinging and pulling back on the flexible structure until it rotates 90 degrees or straightens out. At step 1014, the toggle anchor assembly is pulled towards the first side until the flexible structure is pressed against the second side and surrounding the hole (e.g., as shown in FIG. 24). As an example, the flexible structure may include a spring washer assembly (e.g., spring washer assembly 712 shown in FIG. 30) encapsulated by a deformable material (e.g., flexible cap 710 shown in FIG. 20) configured to create a seal around the hole on the second side of the wall structure when in the expanded state (as shown in FIG. 18).

At step 1016, an annular sheath (e.g., sheath 706 shown in FIGS. 25 and 26) is inserted into the hole around the toggle anchor assembly. The sheath extends from the first side to the second side and comprises a deformable crown (e.g., crown 724 shown in FIG. 25) arranged about an open end (e.g., end 720 shown in FIG. 25) of the sheath adjacent to the first side of the wall structure. The sheath is configured to form a barrier between the hole and the internal thickness surrounding the hole. In some embodiments, inserting the annular sheath into the holes may include causing the crown elements to deform inwards and reduce the outer crown diameter as the crown passes into the hole. In some cases, the sheath includes two parts, such as, e.g., an outer sleeve (e.g., outer sleeve 706a shown in FIG. 25) and an insulation insert (e.g., inner filling 706b shown in FIG. 26). In such cases, step 1016 may include first inserting the outer sleeve into the hole and then inserting the insulation into the outer sleeve.

At step 1018, an annular washer (e.g., washer assembly 106 shown in FIG. 18) is attached to the hole adjacent to the first side of the wall structure by inserting a projection (e.g., projection 136 shown in FIG. 18) of the annular washer into the open end of the sheath for engagement with the deformable upper crown. In some embodiments, the deformable upper crown comprises a plurality of circumferentially spaced elements (e.g., elements 726 shown in FIG. 25) cooperating to form an outer crown diameter. In such cases, attaching the washer may include engaging said washer projection with said crown elements, and forcing the projection against the crown elements to enlarge the outer crown diameter. In some embodiments, forcing the projection may include causing an extent of the upper crown to move radially outward and into a position adjacent to an underside of the hole at the first side of the wall structure.

At step 1020, a strut assembly (e.g., strut assembly 308 shown in FIG. 3) is attached to a receiving portion (e.g., between portions 709 and 719) of the toggle anchor assembly for securement of the strut assembly adjacent to the first side of the wall structure. In some embodiments, the method 1000 further includes: after attaching the annular washer to the hole, coupling an annular spacer (e.g., spacer 104 shown in FIG. 18) to a top surface of the washer, and coupling said strut assembly adjacent to said spacer along the receiving portion. At step 1022, an end assembly (e.g., end assembly 708 shown in FIG. 18) is coupled to the opposite end (e.g., end portion 709) of the toggle anchor assembly. The end assembly is configured to secure the toggle anchor assembly to the wall structure (e.g., as shown in FIG. 24). The method 1000 may end once the end assembly is fully secured.

It should be emphasized that the above-described embodiments, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and protected by the following claims.

The invention claimed is:

1. A mounting assembly for securing a supported element to a wall structure having an internal thickness residing between opposing first and second sides of the wall structure, the assembly comprising:

a toggle anchor assembly configured to pass through a hole formed through the internal thickness, wherein a first extent of the toggle anchor assembly resides within the hole, a second extent of the toggle anchor assembly remains outside the hole adjacent to the first side, and a third extent of the toggle anchor assembly extends past the hole adjacent to the second side, the third extent comprising a flexible structure movable between a compressed state for enabling insertion of the toggle anchor assembly through the hole and an expanded state for securing the toggle anchor assembly against the second side;

an annular sheath configured to reside within the hole surrounding the first extent of the toggle anchor assembly, the sheath comprising a deformable crown arranged about an open end of the sheath adjacent to the first side;

a washer configured for attachment to the hole adjacent to the first side of the wall structure, the washer comprising an open center configured to receive a portion of the second extent of the toggle anchor assembly therethrough, and a projection configured for insertion into the open end of the sheath to engage with the deformable crown;

an end assembly configured for coupling to an end portion of the second extent and for securing the toggle anchor assembly to the wall structure; and a receiving portion for securement of a strut assembly to the toggle anchor assembly, the strut assembly being coupled to the supported element.

2. The mounting assembly of claim 1, wherein the crown of the sheath has an outer diameter configured to mate with an underside of the first side.

3. The mounting assembly of claim 2, wherein the crown comprises a plurality of circumferentially spaced elements cooperating to form the outer diameter.

4. The mounting assembly of claim 3, wherein engagement of the crown by the washer projection forces an extent of each circumferentially spaced element outwardly, thus enlarging the outer diameter of the upper crown.

5. The mounting assembly of claim 1, further comprising a spacer body coupled to an outer surface of the washer, the spacer body having a length extending out from the washer and an outer face coupled adjacent to the receiving portion.

6. The mounting assembly of claim 5, wherein the outer surface of the washer includes a top groove configured to receive the spacer body.

7. The mounting assembly of claim 1, wherein the flexible structure is configured to seal the hole on the second side of the wall structure upon pulling the toggle anchor assembly towards the first side while the flexible structure is in the expanded state.

8. The mounting assembly of claim 7, wherein the flexible structure includes a spring washer assembly encapsulated by a deformable material, the deformable material forming the seal around the hole as the toggle anchor assembly is pulled tight against the second side.

9. The mounting assembly of claim 1, wherein the toggle anchor assembly comprises a threaded fastener pivotably coupled to the flexible structure.

10. The mounting assembly of claim 9, wherein the flexible structure is moved to the compressed state by rotating the flexible structure to a side of the threaded fastener and compressing the flexible structure around the threaded fastener.

11. A method of mounting a supported element to a wall structure having an internal thickness residing between opposing first and second sides of the wall structure, the method comprising:

forming a hole through the internal thickness of the wall structure extending from the first side to the second side;

providing a toggle anchor assembly having a first end configured to pass through the hole and engage the second side of the wall structure while an opposite end of the toggle anchor assembly remains outside of the hole adjacent to the first side;

manipulating a flexible structure included in the first end of the toggle anchor assembly into a compressed state;

inserting the first end of the toggle anchor assembly into the hole adjacent to the first side while maintaining the flexible structure in the compressed state;

pushing the first end of the toggle anchor assembly out of the hole adjacent to the second side;

maneuvering the flexible structure into the expanded state;

pulling the toggle anchor assembly towards the first side until the flexible structure is pressed against the second side and surrounding the hole to create a seal around the hole on the second side of the wall structure when in the expanded state;

attaching an annular washer to the hole adjacent to the first side of the wall structure, the annular washer including an open center for receiving the opposite end of the toggle anchor assembly therethrough;

securing a strut assembly to a receiving portion of the toggle anchor assembly adjacent to the first side of the wall structure; and coupling an end assembly to the opposite end of the toggle anchor assembly, the end assembly configured to secure the toggle anchor assembly to the wall structure, wherein the toggle anchor assembly includes a threaded fastener pivotably coupled to the flexible structure, and the flexible structure includes a spring washer assembly encapsulated by a deformable material.

12. The method of claim 11, further comprising, after attaching the annular washer to the hole, coupling an annular spacer to a top surface of the washer, wherein securing the strut assembly includes coupling said strut assembly to the receiving portion adjacent to said spacer.

13. The method of claim 11, further comprising: inserting an annular sheath into the hole around the toggle anchor assembly, wherein the sheath is configured to form a barrier between the hole and the internal thickness surrounding the hole.

14. The method of claim 13, wherein the annular sheath comprises a deformable crown arranged about an open end of the sheath, the deformable crown being positioned adjacent to the first side of the wall structure once the sheath is inserted into the hole, the method further comprising: inserting a projection of the washer into the open end of the sheath for engagement with the deformable crown.

15. The method of claim 14, wherein the deformable crown comprises a plurality of circumferentially spaced elements cooperating to form an outer crown diameter, and wherein the step of attaching the washer includes engaging said washer projection with said crown elements, and forcing the projection against the crown elements to enlarge the outer crown diameter.

16. The method of claim 15, wherein the step of forcing the projection includes causing an extent of the crown to move radially outward and into a position adjacent to an underside of the hole at the first side of the wall structure.

17. The method of claim 11, wherein maneuvering the toggle anchor assembly includes causing the flexible structure to deploy into the expanded position.

18. The method of claim 11, wherein manipulating the flexible structure into a compressed state includes rotating the flexible structure to a side of the threaded fastener.

19. The method of claim 18, wherein manipulating the flexible structure further includes compressing the flexible structure until a diameter of the flexible structure is less than a diameter of the hole.

20. A mounting assembly for securing a supported element to a wall structure having an internal thickness residing between opposing first and second sides of the wall structure, the assembly comprising:
   a toggle anchor assembly configured to pass through a hole formed through the internal thickness, wherein a first extent of the toggle anchor assembly resides within the hole, a second extent of the toggle anchor assembly remains outside the hole adjacent to the first side, and a third extent of the toggle anchor assembly extends past the hole adjacent to the second side,
   the third extent comprising a flexible structure movable between a compressed state for enabling insertion of the toggle anchor assembly through the hole and an expanded state for securing the toggle anchor assembly against the second side;
   a washer configured for attachment to the hole adjacent to the first side of the wall structure, the washer comprising an open center configured to receive a portion of the second extent therethrough;
   an end assembly configured for coupling to an end portion of the second extent and for securing the toggle anchor assembly to the wall structure;
   a receiving portion for securement of a strut assembly to the toggle anchor assembly, the strut assembly being coupled to the supported element; and
   an annular sheath configured to reside within the hole, surround the first extent of the toggle anchor assembly, and engage the washer, wherein the annular sheath has a body length extending from the first side of the wall panel to the second side of the wall panel, and an extent of said body length is compressed once the washer is attached to the hole.

21. The mounting assembly of claim 20, wherein the annular sheath forms a barrier between the hole and the internal thickness surrounding the hole.

22. The mounting assembly of claim 20, wherein the annular sheath comprises a deformable crown arranged about an open end of the sheath adjacent to the first side; and the washer further comprises a projection configured for insertion into the open end of the sheath to engage with the deformable crown.

* * * * *